United States Patent
Guerra

(10) Patent No.: US 10,876,657 B2
(45) Date of Patent: Dec. 29, 2020

(54) DRILL PIPE OR PRODUCT LINE IMPROVED ROLLERS AND MOVEMENT

(71) Applicant: Quanta Associates, L.P., Houston, TX (US)

(72) Inventor: Pablo Esteban Guerra, Houston, TX (US)

(73) Assignee: Quanta Associates, L.P., Houston, TX (US)

( * ) Notice: Subject to any disclaimer, the term of this patent is extended or adjusted under 35 U.S.C. 154(b) by 302 days.

(21) Appl. No.: 15/789,847

(22) Filed: Oct. 20, 2017

(65) Prior Publication Data

US 2018/0112802 A1    Apr. 26, 2018

Related U.S. Application Data

(60) Provisional application No. 62/550,504, filed on Aug. 25, 2017, provisional application No. 62/411,109, filed on Oct. 21, 2016.

(51) Int. Cl.
*F16L 3/18* (2006.01)
*E21B 7/28* (2006.01)
(Continued)

(52) U.S. Cl.
CPC ...... *F16L 3/18* (2013.01); *E21B 7/28* (2013.01); *E21B 19/24* (2013.01); *E21B 7/046* (2013.01); *E21B 7/20* (2013.01)

(58) Field of Classification Search
CPC ....... F16L 3/18; F16L 3/16; F16L 3/20; F16L 3/202; E21B 7/28; E21B 19/24; E21B 7/046; E21B 7/20
(Continued)

(56) References Cited

U.S. PATENT DOCUMENTS

| 764,491 A | 7/1904 | Newlove |
|---|---|---|
| 2,705,119 A | 3/1955 | Ingwer |

(Continued)

FOREIGN PATENT DOCUMENTS

GB    1448664 A    7/1972

OTHER PUBLICATIONS

Lee W. Young, PCT International Search Report, dated Jan. 17, 2018, 2 pages, ISA/US, Alexandria, Virginia, United States.
(Continued)

*Primary Examiner* — Terrell L McKinnon
*Assistant Examiner* — Michael McDuffie
(74) *Attorney, Agent, or Firm* — Oathout Law Firm; Mark A. Oathout; Laura Tu

(57) ABSTRACT

The disclosure relates to an apparatus for supporting and moving a product line or pipe string in connection with an underground arcuate path in a ground beneath an obstacle, having a platform on the ground; a pivot member connected to the platform; wherein the pivot member defines a pivot axis substantially perpendicular to the ground; and at least one rotator connected to the pivot member; wherein the at least one rotator pivots about the pivot axis in relation to the platform. The disclosure also relates to an omnidirectional roller apparatus for supporting and moving a product line or pipe string in connection with an underground arcuate path in a ground beneath an obstacle, having a stand mounted on the ground, wherein the stand has a frame; a bearing mounted on the frame; a rotational shaft mounted to the bearing, and a Mecanum wheel mounted on the rotational shaft.

8 Claims, 32 Drawing Sheets

(51) Int. Cl.
*E21B 19/24* (2006.01)
*E21B 7/20* (2006.01)
*E21B 7/04* (2006.01)

(58) Field of Classification Search
USPC ........ 248/49, 55, 65, 67.7, 68.1, 73; 269/71, 269/45, 266
See application file for complete search history.

(56) References Cited

U.S. PATENT DOCUMENTS

| | | | | |
|---|---|---|---|---|
| 3,602,492 | A | * | 8/1971 | Petrie ................. B25H 1/00 269/296 |
| 3,876,255 | A | * | 4/1975 | Ilon .................. B60B 19/003 301/5.23 |
| 5,028,149 | A | | 7/1991 | Hardtke |
| 5,337,875 | A | * | 8/1994 | Lee ................... B65G 13/12 193/35 C |
| 6,179,024 | B1 | * | 1/2001 | Yang .................. B23Q 1/76 144/287 |
| 6,520,456 | B1 | | 2/2003 | Neider et al. |
| 6,592,093 | B2 | | 7/2003 | Valentz |
| 6,988,719 | B2 | * | 1/2006 | Ursell ................ B23Q 3/105 248/269 |
| 7,475,513 | B2 | * | 1/2009 | Parker ................ F16L 3/1091 248/49 |
| 8,464,410 | B1 | * | 6/2013 | Lyon .................. B29C 31/002 228/4.1 |
| 8,646,731 | B2 | * | 2/2014 | Burles ................. F16L 3/16 144/287 |
| 8,833,862 | B2 | | 9/2014 | Gunther |
| 9,398,198 | B2 | * | 7/2016 | Choi ................... H04N 7/185 |
| 10,724,656 | B2 | * | 7/2020 | Comalander .......... F16L 3/02 |
| 2002/0020787 | A1 | * | 2/2002 | Parker ................. F16L 3/18 248/70 |
| 2006/0115189 | A1 | | 6/2006 | Koch |
| 2009/0008513 | A1 | * | 1/2009 | Preston ............... E21B 19/15 248/55 |
| 2009/0212170 | A1 | * | 8/2009 | Riibe .................. F16L 1/09 248/58 |
| 2010/0156168 | A1 | * | 6/2010 | Scogna ............... B60B 19/003 301/5.23 |
| 2012/0256471 | A1 | * | 10/2012 | Scogna ............... B60B 19/003 301/5.23 |
| 2013/0140801 | A1 | * | 6/2013 | Schlee ................ B60B 39/00 280/762 |
| 2014/0189968 | A1 | * | 7/2014 | Kim ................... B08B 9/049 15/88 |
| 2014/0339375 | A1 | * | 11/2014 | Birch .................. F16L 3/18 248/49 |
| 2016/0375723 | A1 | * | 12/2016 | Jochim ............... B60B 19/003 280/30 |
| 2017/0308084 | A1 | * | 10/2017 | Spicer ................. G05D 1/0295 |
| 2018/0050563 | A1 | * | 2/2018 | Zhang ................ B60B 19/12 |
| 2018/0080905 | A1 | * | 3/2018 | Al Nahwi ............ B25J 9/0009 |
| 2018/0229404 | A1 | * | 8/2018 | Starr .................. B29C 35/0805 |
| 2018/0229549 | A1 | * | 8/2018 | Nakamura .......... B60B 27/0015 |
| 2019/0084364 | A1 | * | 3/2019 | Lagrandcourt ....... B62D 61/00 |
| 2019/0145471 | A1 | * | 5/2019 | Carbone ............. F16D 49/10 180/210 |
| 2019/0390798 | A1 | * | 12/2019 | McDonald ........... F16L 3/18 |

OTHER PUBLICATIONS

Lee W. Young, PCT Written Opinion of the International Searching Authority, dated Jan. 17, 2018, 11 pages, ISA/US, Alexandria, Virginia, United States.

* cited by examiner

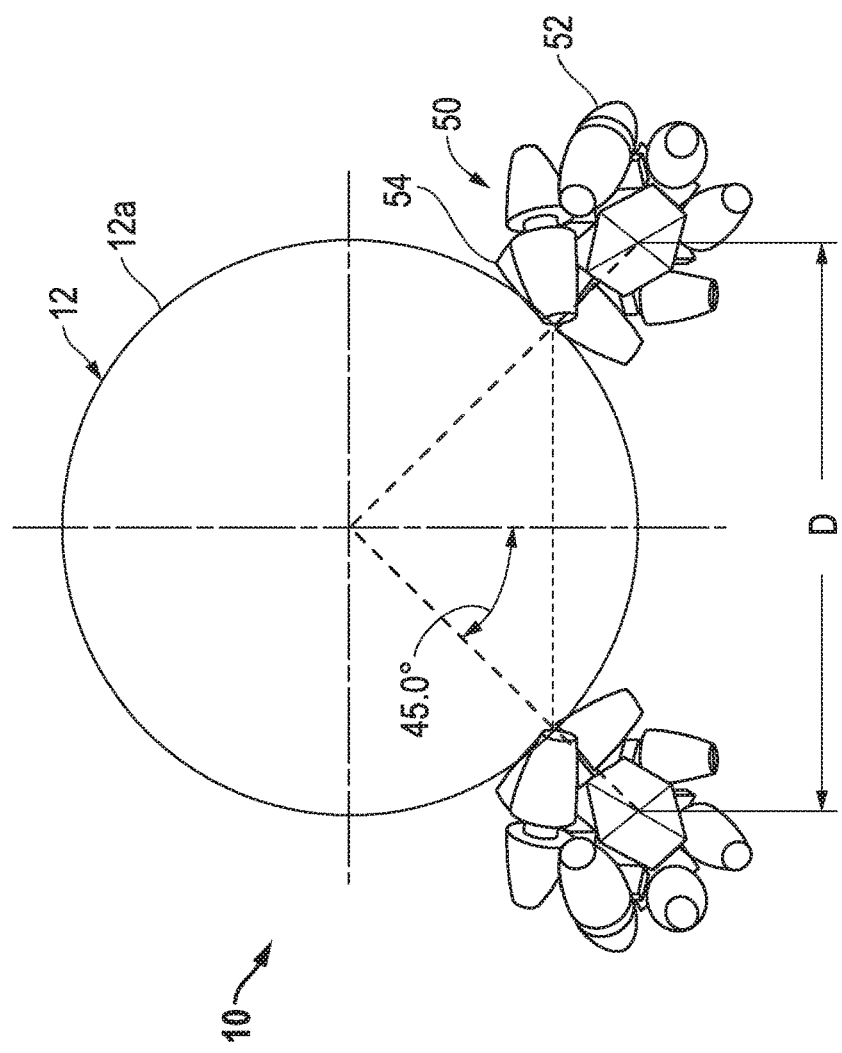
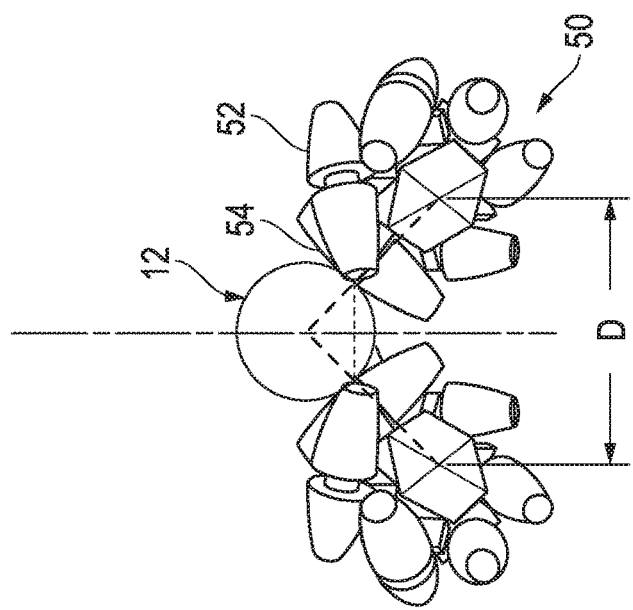
FIG. 1
FIG. 2

DRILL PIPE OR PRODUCT LINE IMPROVED ROLLERS AND MOVEMENT

STATEMENTS REGARDING FEDERALLY SPONSORED RESEARCH OR DEVELOPMENT

Not Applicable.

NAMES OF THE PARTIES TO A JOINT RESEARCH AGREEMENT

Not Applicable.

BACKGROUND

Technical Field use of drill pipe long tail string while reaming or installation of product line using rollers to support and assist in moving same.

During HDD operations, and at the end of them, a product line may be pulled into an underground arcuate path. The product line may be supported by rollers to avoid damage to the coating and reduce pulling force due to contact with the soil. The standard rollers currently used in the industry are normally located only on one side of the crossing called exit site, opposite the called entry site (where usually the drilling rig is set up). Such rollers generate a low coefficient of friction in the direction of movement of the product line, but inhibiting eventually necessary and/or safe rotation of the product line circumferentially, plus each joint of the product line may weight several thousands of pounds (lbs.) creating challenges to moving and rotating the product line. Unintentional rotation of the product line over the currently used rollers can result in the rollers flipping or breaking during operations. Workers may also be located in the vicinity of the product line during pull back operation performing monitoring, coating repairs, etc., therefore, being exposed to accidents created by the rotation of the product line and its consequences on the standard currently used rollers. However, in other situations, controlled rotation of the product line may be desired.

During reaming operations, one of the options is to add or remove joints of drill pipe at the exit site as reaming process progresses. This is done typically by the use of chain-tongs (which could be operated hydraulically or by the assistance of an excavator) and requires radio communication with the driller at entry site and coordination of tasks. To minimize the time that consumes the addition or removal of drill pipe joint-by-joint, a technique was developed which involves using what is called tail string. The tail string is basically a certain number of joints of drill pipe that remain screwed and torqued together, therefore, instead of adding or removing a single joint of drill pipe every time, the full tail string is added or removed. Usually (and depending on space constraints) up to ten joints of drill pipe are left together making a tail string, thus, every ten joints of reaming there is only one connection or disconnection instead ten. Tail strings are usually limited to ten joints of drill pipe as length because longer tail strings start creating high torque, that must be exerted by the drilling rig, reducing its capacity to apply proper torque to the reamer being used to enlarge the hole.

SUMMARY

One solution is to set up the tail strings over a group of holders (omnidirectional rollers) that allow longitudinal and rotational movement at the same time with low friction coefficient. Thus, an objective relates to pushing, pulling and rotating product line or drill pipe with minimal friction and drag via the use of omnidirectional rollers. Embodiments and methods relate to an improved roller apparatus for supporting and allowing movement of a product line or drill pipe tail string in connection with an underground arcuate path in a ground beneath an obstacle. The improved omnidirectional roller apparatus for supporting and moving a product line or drill pipe tail string in connection with an underground arcuate path in a ground beneath an obstacle has a stand mounted on the ground, wherein the stand has a frame. One or more bearings are mounted on the frame and one or more rotational shafts are mounted to the bearings. One or more Mecanum wheels are mounted on the rotational shaft(s). In one exemplary embodiment, the omnidirectional roller apparatus may have four bearings, and at least two rotational shafts, and two Mecanum wheels. The frame of the omnidirectional roller apparatus may further include a platform which has a plurality of upright supports, and wherein the upright supports may be two shorter posts and two longer posts. The rotational shafts have a mounting angle relative to the ground and/or to the product line. The mounting angle may be defined by the shorter posts and longer posts; and the mounting angle may be forty-five degrees from the longitudinal axis, forty-five degrees from the vertical axis, and forty-five degrees from the transversal axis. Further, the Mecanum wheel may have a plurality of rollers, and each of the plurality of rollers of the Mecanum wheel may include a means for protecting the product line. In said exemplary embodiment of the omnidirectional roller apparatus, the bearing may be mounted, one each on top of the shorter posts and longer posts; and wherein said Mecanum wheel is mounted proximate the center along the length of the rotational shaft. The bearing may also be in the center of the Mecanum wheel. In an exemplary embodiment of the omnidirectional roller apparatus, the lateral width of the frame may be adjustable. A disclosed embodiment relating to a method for use of the improved omnidirectional roller apparatus for selectively installing a pipe from above a ground for use in an underground arcuate path beneath an obstacle, and for using another pipe at an exit site during reaming operations of HDD activities for use in the underground arcuate path beneath the obstacle, includes the steps of: supporting the pipe on sets of two Mecanum wheels; rotating the pipe on the Mecanum wheels; and moving the pipe longitudinally across the Mecanum wheels.

An alternate disclosed exemplary embodiment for a pivotable roller stand includes an apparatus for supporting and moving a product line or drill pipe tail string in connection with an underground arcuate path in a ground beneath an obstacle, having: a platform on the ground; a pivot member connected to the platform, wherein the pivot member defines a pivot axis substantially perpendicular to the ground; and at least one rotator connected to the pivot member, wherein the at least one rotator pivots about the pivot axis in relation to the platform and rotates about a rotator axis. The improved pivotable roller stand may include a secondary platform connected and fixed in relation to the rotator, wherein the secondary platform is above the platform; and further wherein the pivot member is connected to the rotator via mounting the pivot member to the secondary platform. The improved pivotable roller stand may also include upright supports as well, which may be fixed to an end of the rotator. The pivot member may be connected to the rotator by mounting the pivot member to the upright support. The improved pivotable roller stand apparatus may also include a means for locking the platform, wherein the means for locking is intended to prevent the pivot member from rotating beyond a desired position.

Furthermore, the described exemplary embodiments for the improved pivotable roller stand apparatus may include a wheel connected to an underside of the secondary platform, a track mounted onto the platform, wherein the track is an arcuate pathway circumscribed about the pivot member, and have brushes adjacent to the wheel. In alternate exemplary embodiments, the improved pivotable roller stand apparatus may instead include a track on the underside of the secondary platform and have wheels inserted into the track.

Alternative exemplary embodiments include self-centering pivotable holder or roller stands having rotator(s) which allow longitudinal movement only of the product line or drill pipe, and which the rotator(s) pivots to adjust for misalignment of the product line. The pivot member of the self-centering pivotable roller stand may be located at a geometrical center of the rotator(s).

A further exemplary embodiment includes an eccentric pivotable holder or roller stands which allow longitudinal movement and also rotational movement in one desired direction only (either clockwise or counter-clock wise) of the product line or drill pipe and fixing the rotator(s) in a desired pivot angle. The pivot member of the end or eccentric roller stand may be located at a noncentral area of the rotator(s).

The disclosed embodiments also relate to a method for supporting and moving a pipe in connection with an underground arcuate path in a ground beneath an obstacle, having the steps of pivoting a rotator relative to a platform on the ground wherein the rotator enables moving of the pipe axially. The disclosed method embodiment may also include the step of moving the pipe rotationally whilst reducing resistance via the pivoting step. Further, the described embodiment may include the step(s) of preventing the rotator from pivoting beyond a set pivot angle; installing a track on the platform; and brushing debris off the track. This method may further include the steps of pivoting the rotator at a geometrical center of the rotator or, alternately, pivoting the rotator at a non-central area of the rotator. The step of pivoting the rotator at a geometrical center of the pipe may further include the step of self-squaring a longitudinal axis of the rotator in relation to a longitudinal axis of the pipe as a result of the step of pivoting the rotator at the geometrical center of the rotator. The step of pivoting the rotator at a noncentral area of the rotator may further include the steps of rotating the pipe; wherein a longitudinal axis of the pipe may be nonsquare in relation to a longitudinal axis of the rotator; and reducing a static coefficient of friction between the pipe and the rotator.

As used herein the terms "product line" shall refer to a conduit, pipe, tubular, duct, casing and/or the like.

As used herein the term "self-centering" or "self-squaring" shall refer to the ability of the improved rotators to pivot the position of the axle of the rotators to a perpendicular or square position in relation to the longitudinal axis of the product line, pipe, pipe string or drill pipe tail string (i.e. when viewed from above or below).

As used herein the term "geometrical center of the rotator" shall refer to approximately the center point or midway point of one or respectively more rotators, or approximately the center point or midway point of the rotator axle(s) of the one or respectively more rotators, or approximately the center point or midway point of the length of the rotators. As used herein, the "geometrical center" may be extended to include the area directly beneath the actual "geometrical center" which may be located within the rotators or rotator axles themselves.

As used herein, the "non-central or noncentral area, point or location of the rotators" shall refer to any area, point or location that excludes the geometrical center of the rotators as defined.

BRIEF DESCRIPTION OF THE DRAWINGS

The exemplary embodiments may be better understood, and numerous objects, features, and advantages made apparent to those skilled in the art by referencing the accompanying drawings. These drawings are used to illustrate only exemplary embodiments, and are not to be considered limiting of its scope, for the disclosure may admit to other equally effective exemplary embodiments. The figures are not necessarily to scale and certain features and certain views of the figures may be shown exaggerated in scale or in schematic in the interest of clarity and conciseness.

FIG. 1 depicts a schematic elevation view of an exemplary embodiment of a roller with a large diameter product line on the new roller.

FIG. 2 depicts a view similar to FIG. 1 but carrying a smaller diameter drill pipe and having a shorter lateral distance between the Mecanum wheels.

DESCRIPTION OF EMBODIMENT(S)

Figure 3:
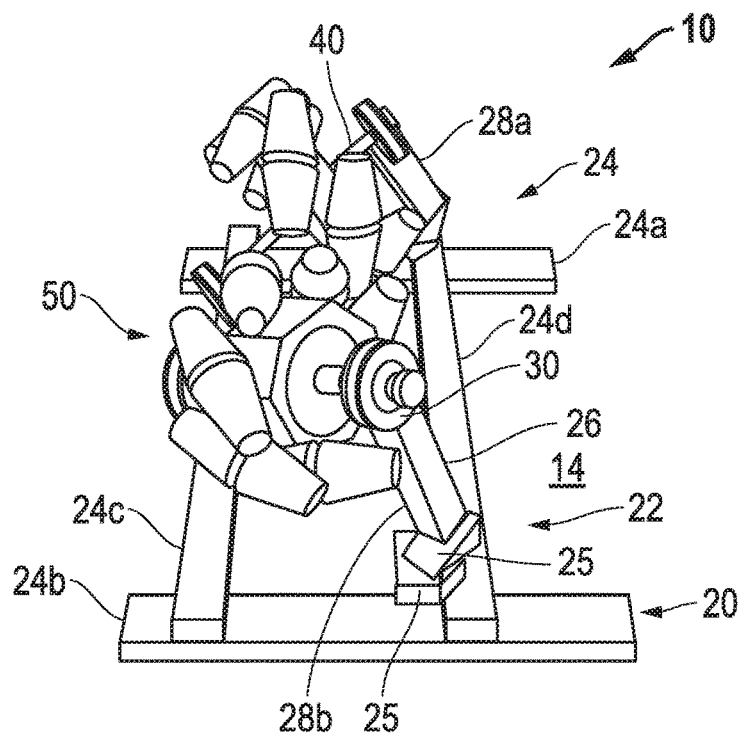
FIG. 3 depicts a perspective view of an exemplary embodiment of a new roller.
Figure 4:
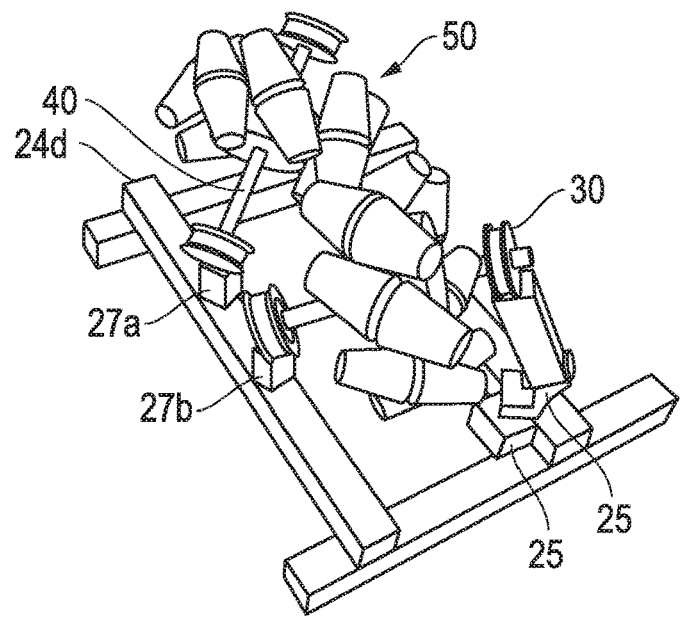
FIG. 4 depicts a perspective view of an exemplary embodiment of a new roller.
Figure 5:
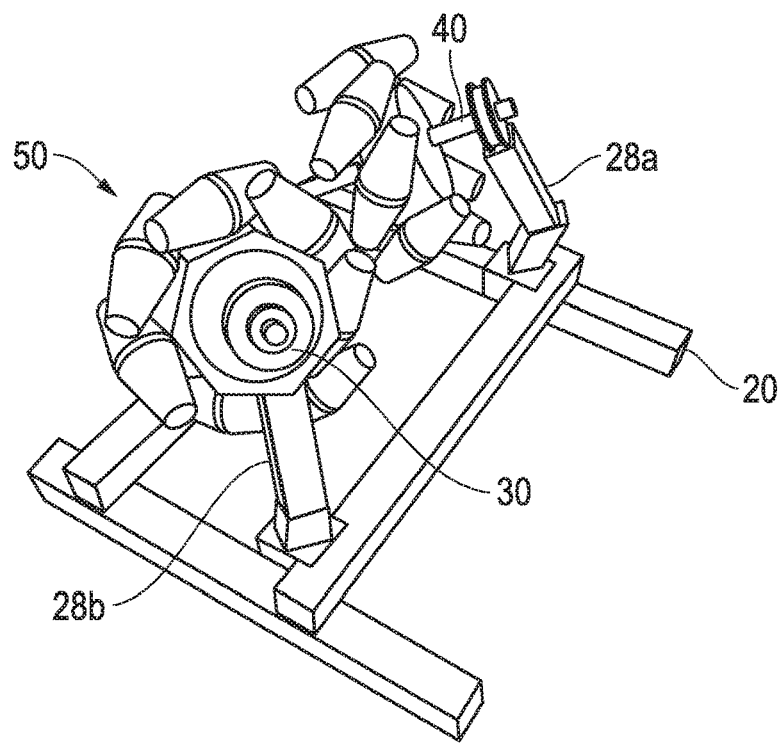
FIG. 5 depicts a perspective view of an exemplary embodiment of a new roller.
Figure 6:
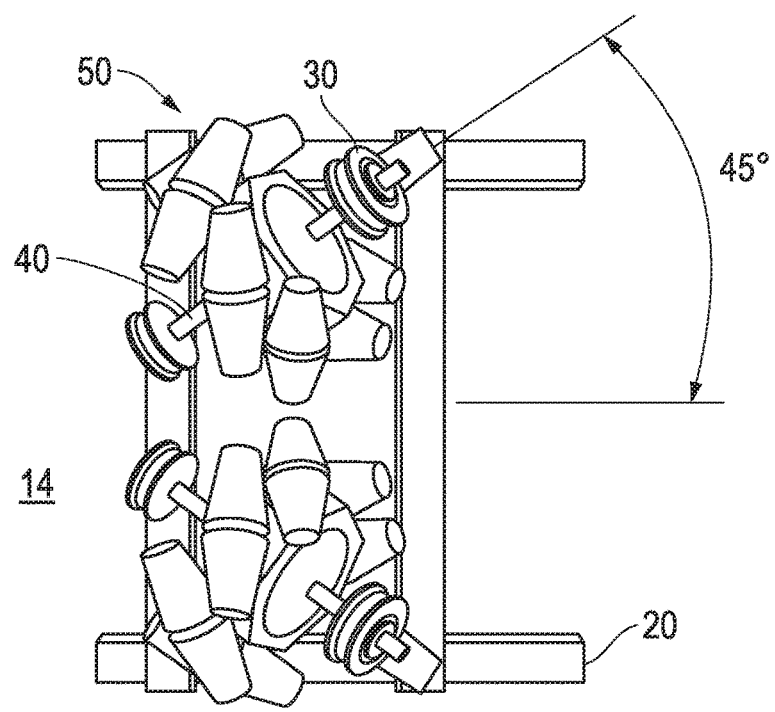
FIG. 6 depicts a top view of an exemplary embodiment of a new roller.
Figure 7:
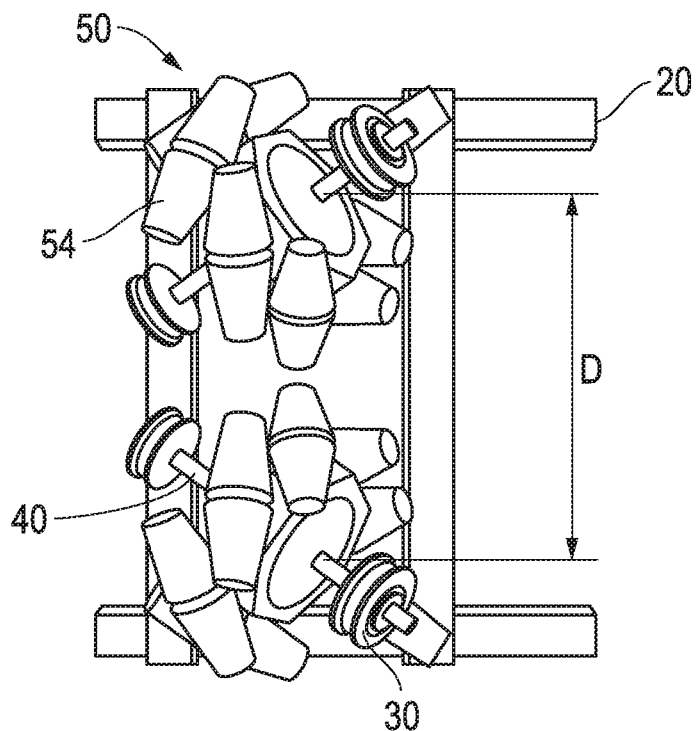
FIG. 7 depicts a top view of an exemplary embodiment of a new roller.
Figure 8:
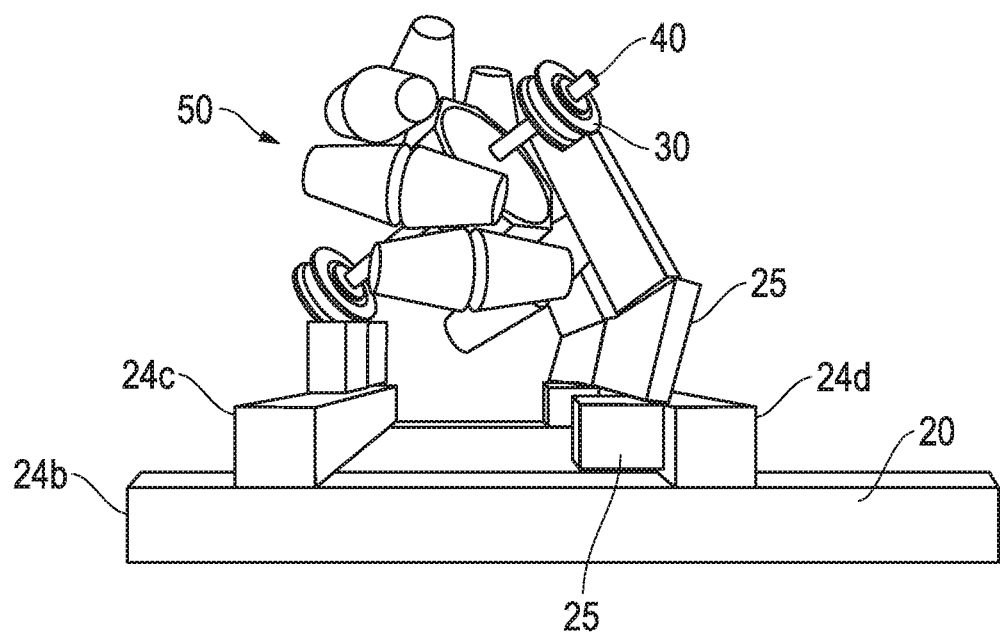
FIG. 8 depicts a lateral view of an exemplary embodiment of a new roller.
Figure 9:
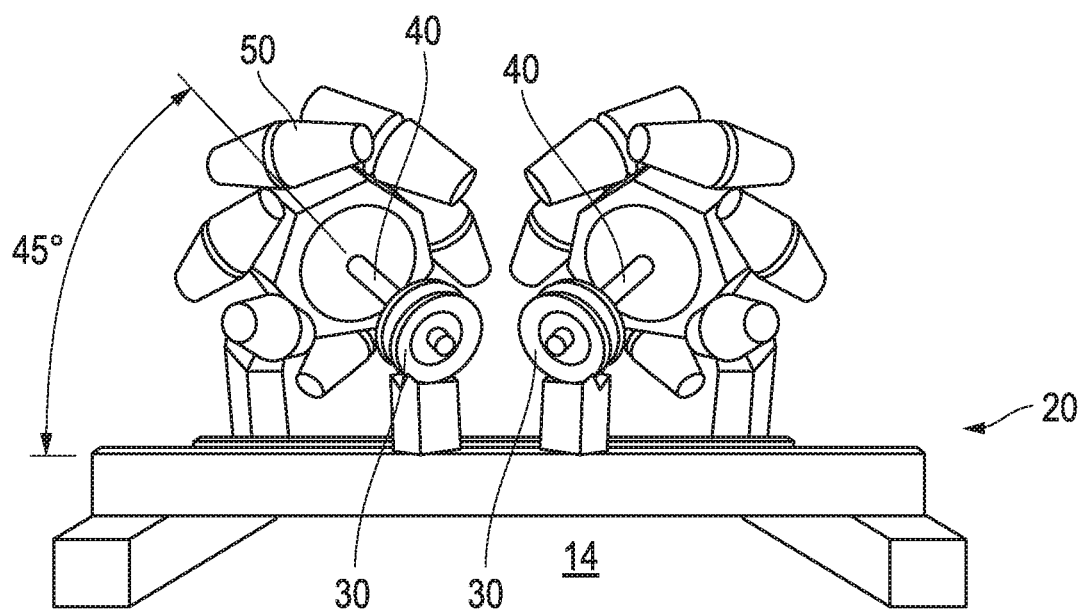
FIG. 9 depicts a front view of an exemplary embodiment of a new roller.
Figure 10:
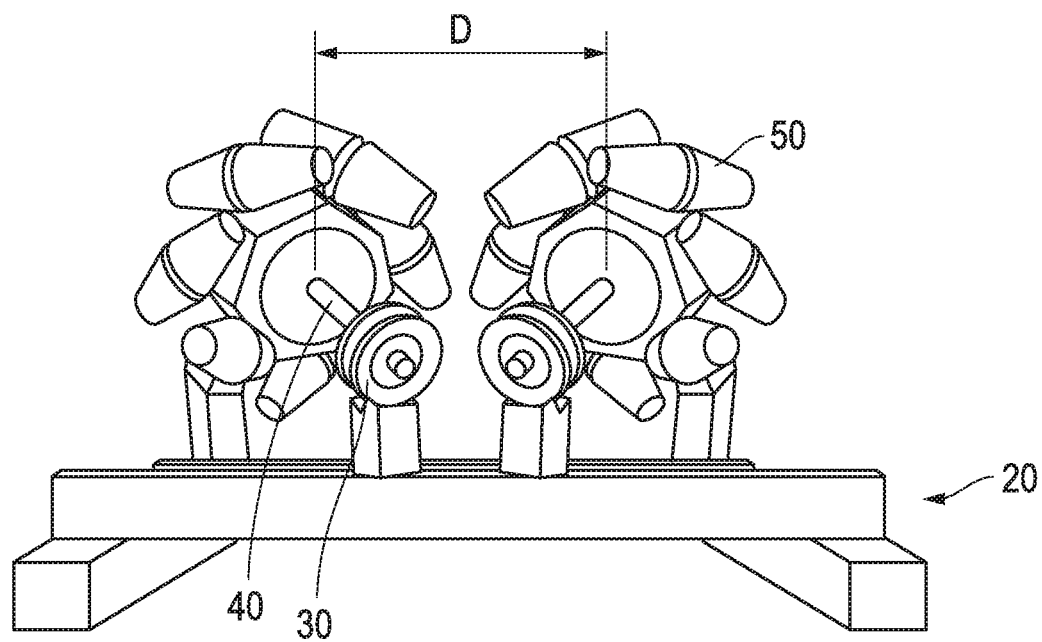
FIG. 10 depicts a front view of an exemplary embodiment of a new roller.
Figure 11:
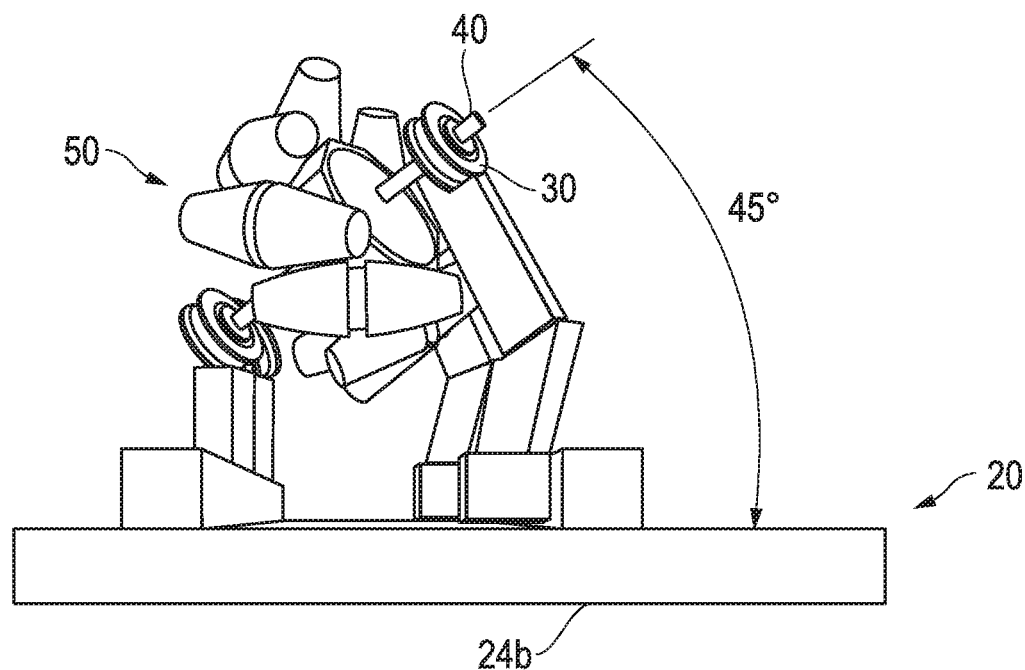
FIG. 11 depicts a lateral view of an exemplary embodiment of a new roller.
Figure 12:
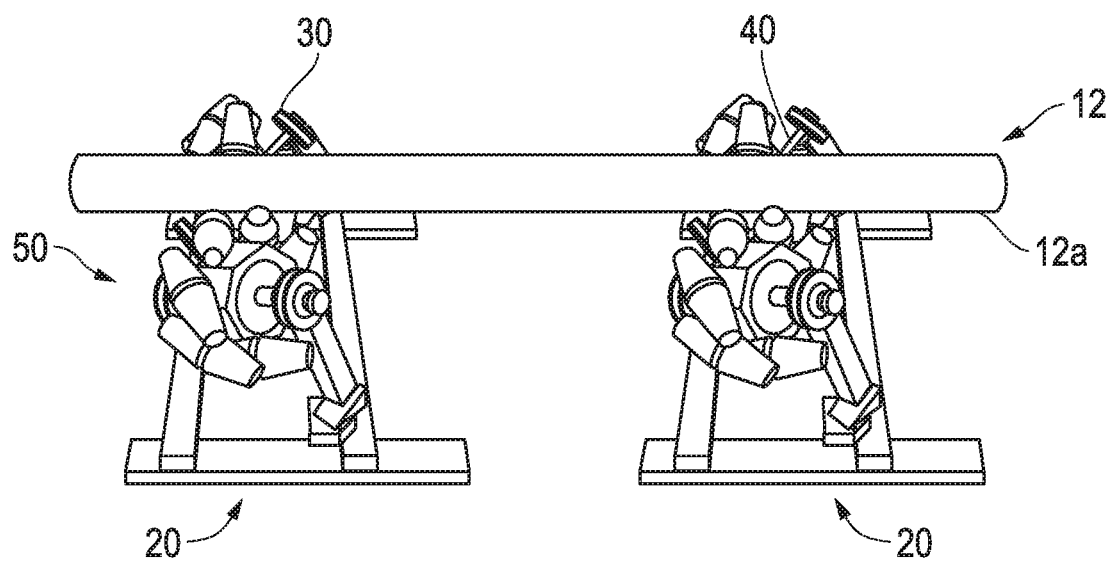
FIG. 12 depicts a top perspective view of an exemplary embodiment of new rollers with product line.
Figure 13:
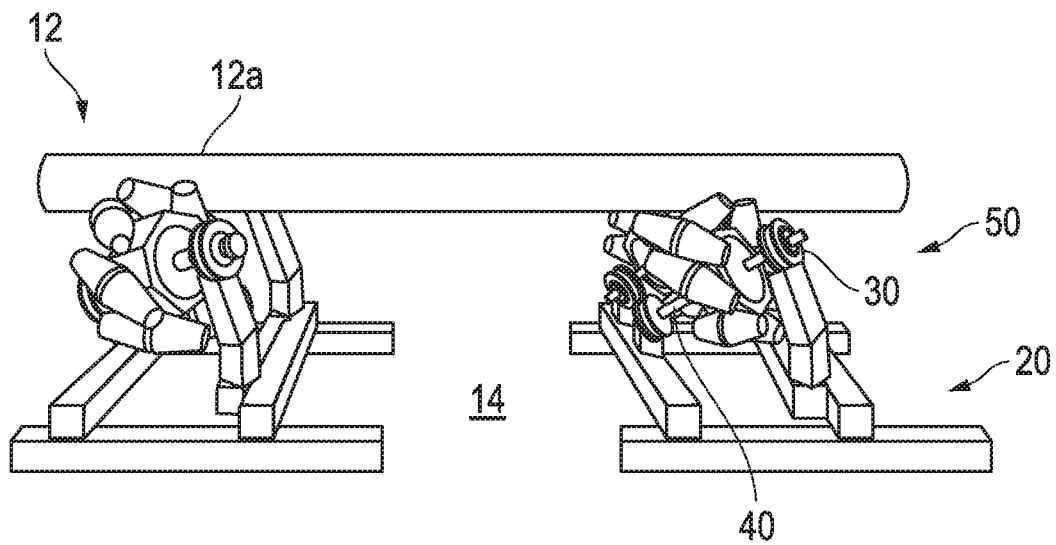
FIG. 13 depicts a lateral perspective view of an exemplary embodiment of new rollers with product line.
Figure 14:
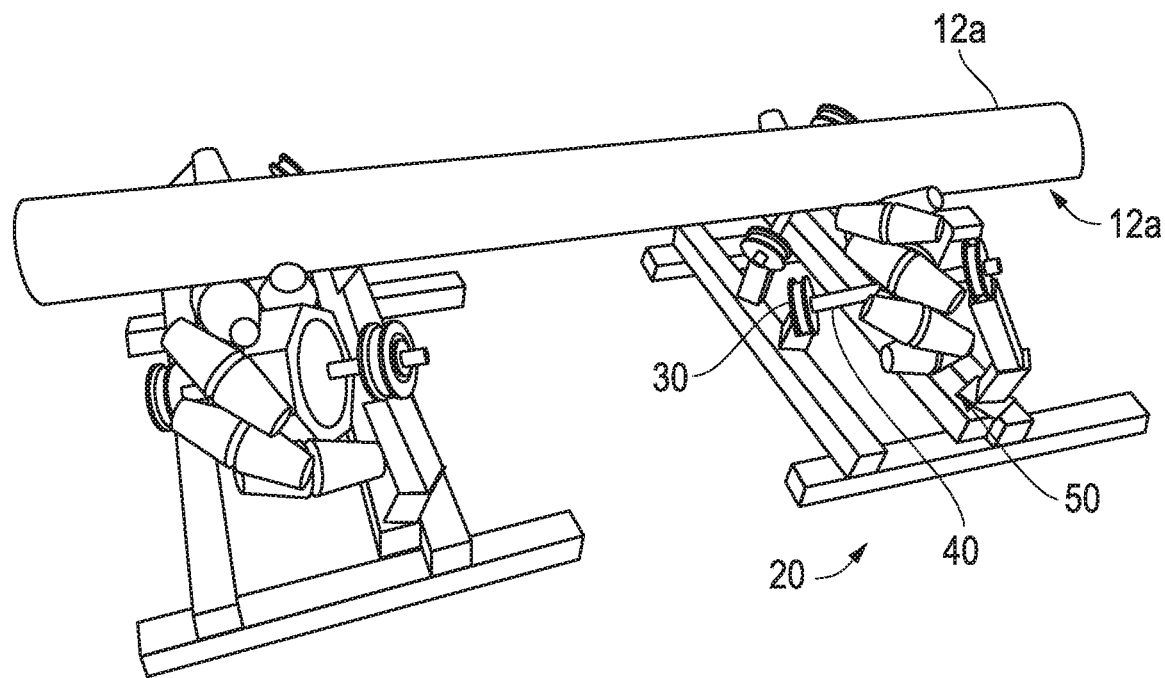
FIG. 14 depicts a perspective view of an exemplary embodiment of new rollers with product line.
Figure 15:
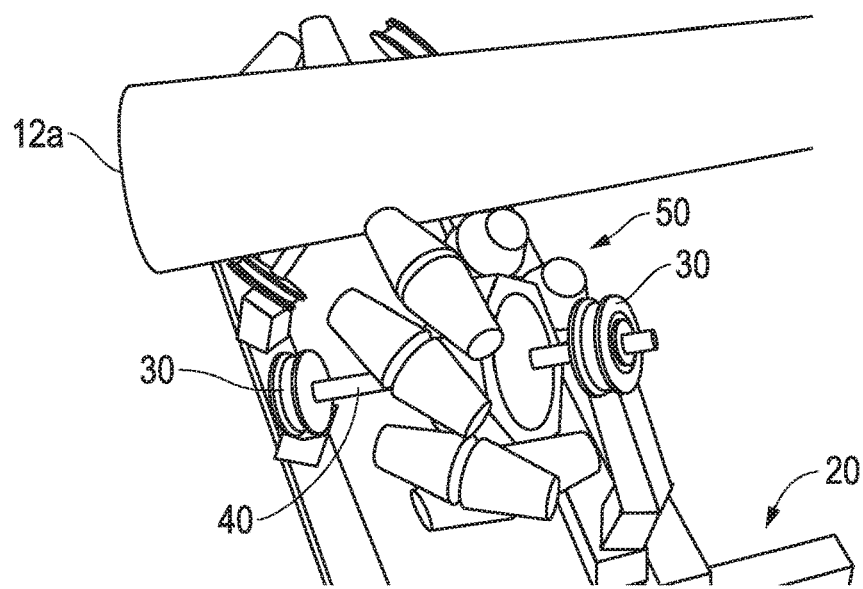
FIG. 15 depicts a top perspective view of an exemplary embodiment of a new roller with product line.
Figure 16:
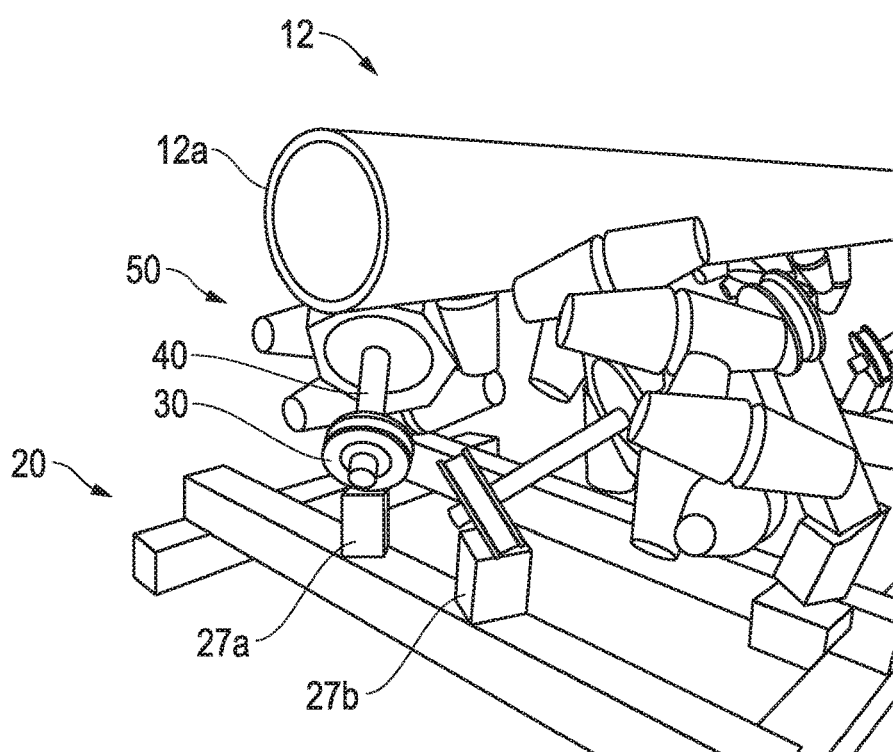
FIG. 16 depicts a perspective view of an exemplary embodiment of a new roller with product line.
Figure 17:
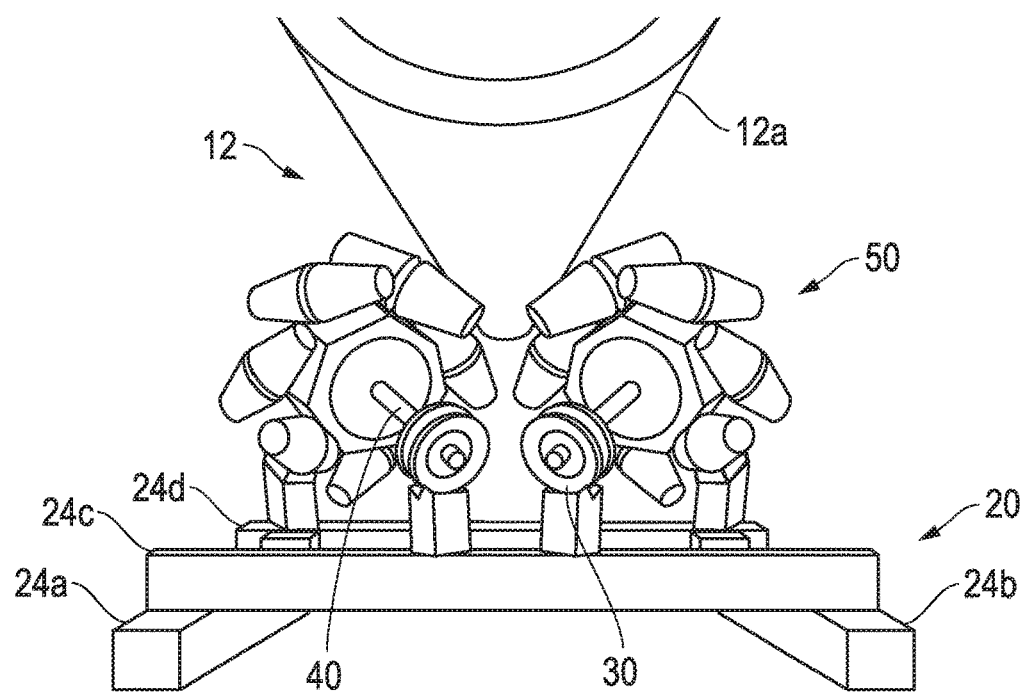
FIG. 17 depicts a front elevation view of an exemplary embodiment of a new roller with product line.
Figure 18:
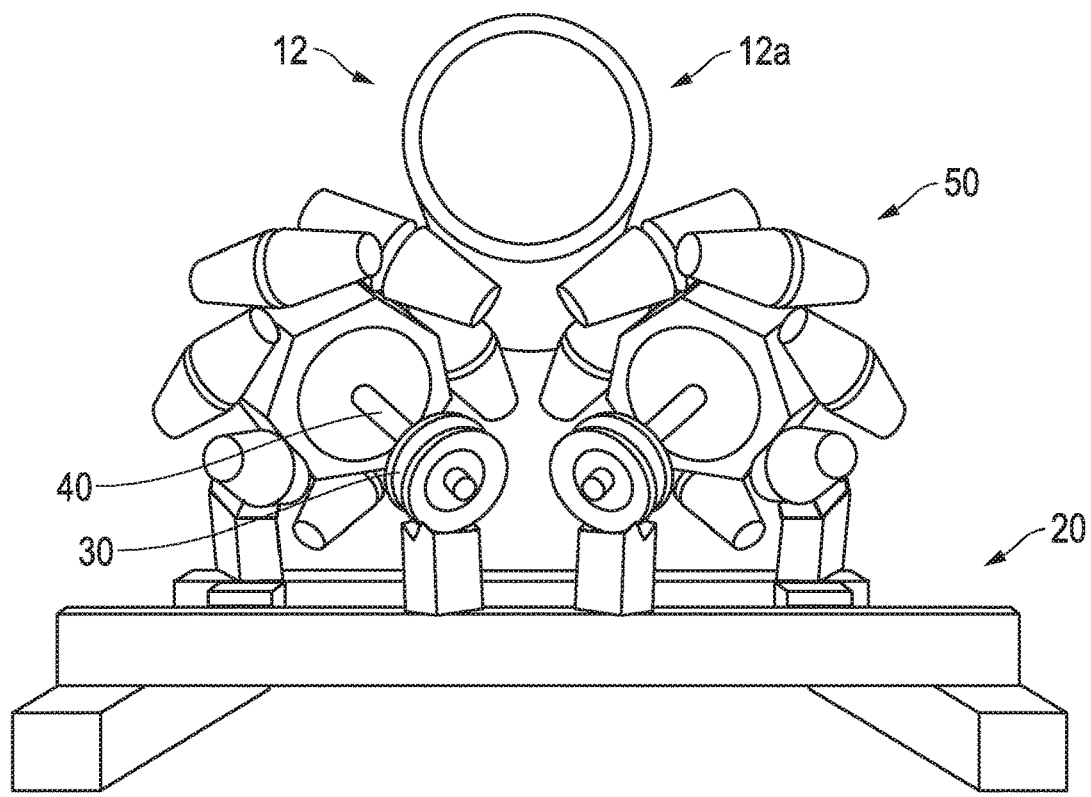
FIG. 18 depicts a front elevation view of an exemplary embodiment of a new roller with product line.
Figure 19:
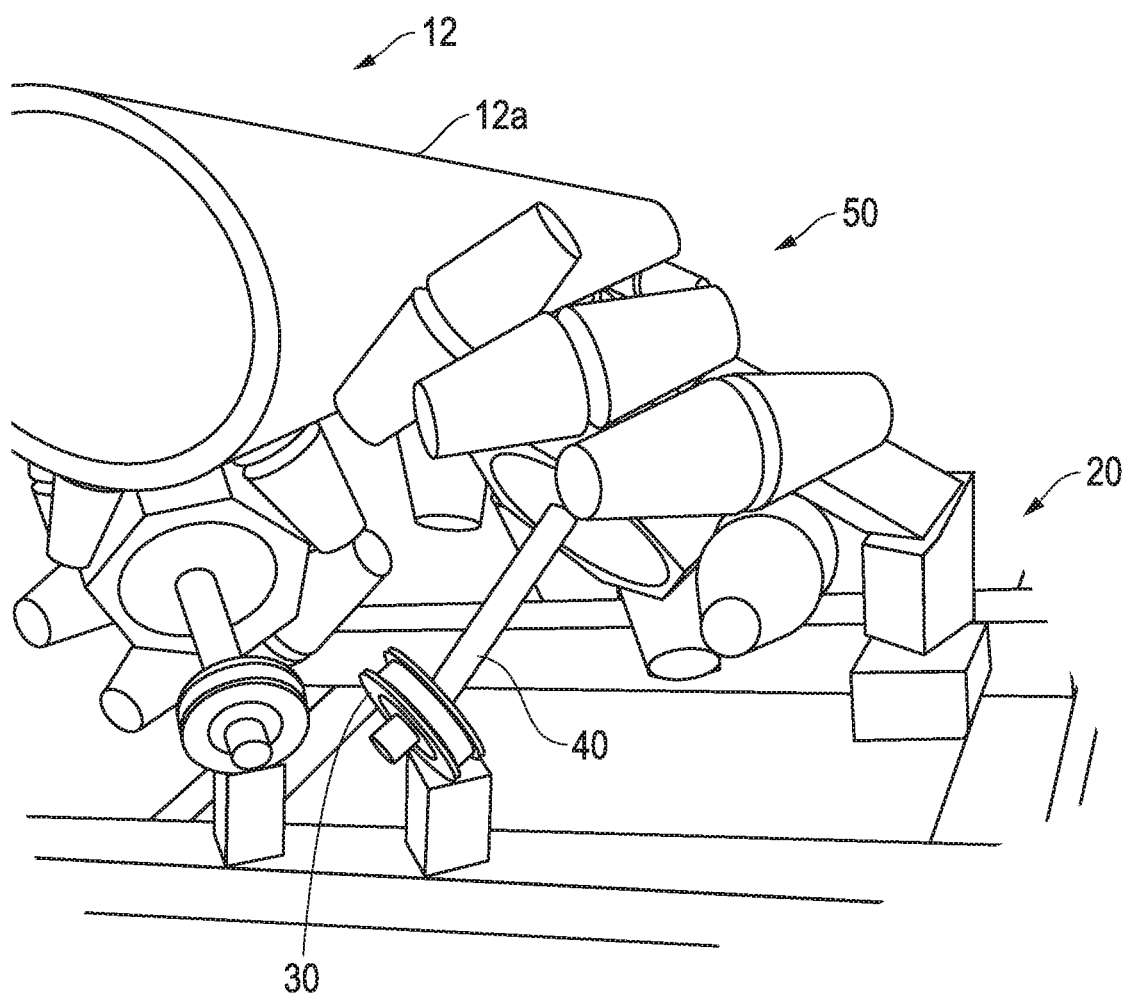
FIG. 19 depicts a perspective elevational view of an exemplary embodiment of a new roller with product line.

The description that follows includes exemplary apparatus, methods, techniques, and instruction sequences that embody techniques of the inventive subject matter. However, it is understood that the described embodiments may be practiced without these specific details.

Referring to FIGS. 1-19, disclosed exemplary embodiments relate to the installation, rolling, and/or movement by means of omnidirectional or multidirectional roller(s) 10 of product line 12 and the apparatus of same. In one exemplary embodiment the roller(s) 10 may be implemented into a system for horizontal directional drilling (HDD) for support and movement of product line 12 (by way of example only, but not limited to, plastic pipe such as HDPE, FPVC, or PVC, fiberglass, steel, or any relatively weak walled product lines 12) in and as part of directional crossings (or other product line movement applications).

As defined above the product line 12 may be a pipe or tubular 12a. The product line 12 may be pushed, pulled and/or rotated across the rollers 10 as part of, for example, a HDD project and installation. The product line 12 (e.g. pipe or tubular 12a) may be coated in exemplary embodiments. If coated, the rollers 10 are designed to protect and preserve such coating on the product line 12.

The rollers 10 for supporting, rolling, and/or moving the product line 12 generally have a stand 20, bearing(s) 30, rotational shaft(s) 40, and Mecanum wheels 50.

The stand 20 generally includes or is a frame or framework 22. Many embodiments of a stand 20 may be implemented, being the spacing between them to be determined by the characteristics of the product line or drill pipe and the terrain where they will operate. In one exemplary embodiment of a stand 20 the frame 22 includes a first or primary platform 24 and upright supports 26. The primary platform 24 has two lower beams 24a and 24b to be mounted on the ground 14 and aligned horizontally and generally parallel to the axial direction of the product line 12 to be installed. The lower beams 24a and 24b are spaced laterally apart a sufficient distance to support the product line 12 to be supported, pushed, pulled and rotated. The primary platform 24 also has two cross beams 24c and 24d to be mounted on the two lower beams 24a and 24b and aligned horizontally and generally perpendicular to the two lower beams 24a and 24b. The upright supports 26 are generally two shorter posts 27a and 27b and two longer posts 28a and 28b. The two shorter posts 27a and 27b are mounted on cross beam 24c. The two longer posts 28a and 28b are mounted on cross beam 24d. Brace/joint pieces 25 may also be implemented as desired along the primary platform 24 and/or any or all of the two shorter posts 27a and 27b and the two longer posts 28a and 28b. The two shorter posts 27a and 27b are implemented to connect proximate one end of each respective rotational shaft 40. The two longer posts 28a and 28b are implemented to connect proximate a second end of each respective rotational shaft 40. In the exemplary embodiment shown, each respective connection is made via a bearing 30. Although not shown, the frame 22 could implement one or more trusses for support.

In certain exemplary embodiments, the lateral width D of the frame 22 may be adjusted. Generally, the purpose of same is to adjust the distance between each pair of Mecanum wheels 50 to accommodate product line 12 or drill pipe of varying diameters. Such adjustment of the lateral width D may be made by moving only one side of the frame 22, or by moving each/both sides of the frame 22. Referring to FIGS. 1 and 2 comparing and contrasting same by way of example, a product line 12 having an outer diameter of thirty-six inches with Mecanum wheels 50 having an outer diameter of sixteen inches is represented in FIG. 1, whereby the lateral width D may be established as about 36.17 inches. In FIG. 2, a product line 12 having an outer diameter of 8.5 inches with Mecanum wheels 50 having an outer diameter of sixteen inches is represented, whereby the lateral width D may be established as about 16.68 inches.

A bearing 30 may be installed by means of an appropriate bearing pillow to the top of each upright support 26 (i.e. to the top of each of the two shorter posts 27a and 27b and to the top of each of the two longer posts 28a and 28b). The connection may be made such that the central axial direction of each bearing 30 is at an angle to the vertical or horizontal. The mounting angle is preferably the same for each pair of bearings 30 on a stand 20. In one exemplary embodiment the mounting angle for the bearings is forty-five degrees respect the three framework 22 main axes, longitudinal, transversal and vertical. Each pair of bearings 30 mounted on a stand 20 on consecutive shorter post (e.g. 27a) and longer post (e.g. 28a) are mounted such that the axis of rotation of each pair is aligned (for mount of the rotational shaft 40). The connection between each bearing 30 and each respective post 27 can be a fixed connection to preserve the appropriate angle respect the framework 22. The bearings 30 may be positioned (e.g. via the posts 27) at any position along the rotational shaft 40 (e.g. the ends, middle, etc.). Each bearing 30 may be an off-the-shelf part.

The rotational shaft 40 may be mounted through the axis of rotation of each consecutive pair of bearings 30 on the stand 20 (i.e. via each consecutive shorter post (e.g. 27a) and longer post (e.g. 28a)). For mounting of the Mecanum wheel 50, it is normally critical that the mounting angle of the rotational shaft 40 be at an angle that is forty-five degrees from the longitudinal, forty-five degrees from the vertical, and forty-five degrees from the transversal. The rotational shaft 40 may turn/rotate within the bearings 30, may be fixed (i.e. no rotation) relative to and within bearing(s) 30 optionally mounted to the Mecanum wheel 50 (allowing the Mecanum wheel 50 to rotate relative to and on the rotational shaft 40), or both the rotational shaft 40 and the Mecanum wheel 50 can rotate. Bearings 30 may be mounted in the center of the Mecanum wheel 50 (one or more) plus mounted at the ends of the rotational shaft 40 for redundancy.

It may be desirable to maintain the frame 22 as low to the ground 14 as possible to create a low center of gravity for the rollers 10. Regardless of the positioning of the frame 22 under the pipe or tubular 12a, the pipe or tubular 12a is able solely to rotate about its own longitudinal axis (circumferentially); is able solely to move in a for-aft or back-and-forth motion along or coincident with its own longitudinal axis; or at the same time, both rotate about its own longitudinal axis and move for-aft along its own longitudinal axis such that the rollers 10 rotate as necessary and also the Mecanum wheel 50 rotates about rotational shaft 40 as necessary to maintain pipe or tubular 12a at its position against, upon and between, for example, two Mecanum wheels 50 at a pipe or tubular 12a supporting location as depicted in at least FIGS. 13 and 14, each which depict two pipe-supporting locations.

Figure 20:
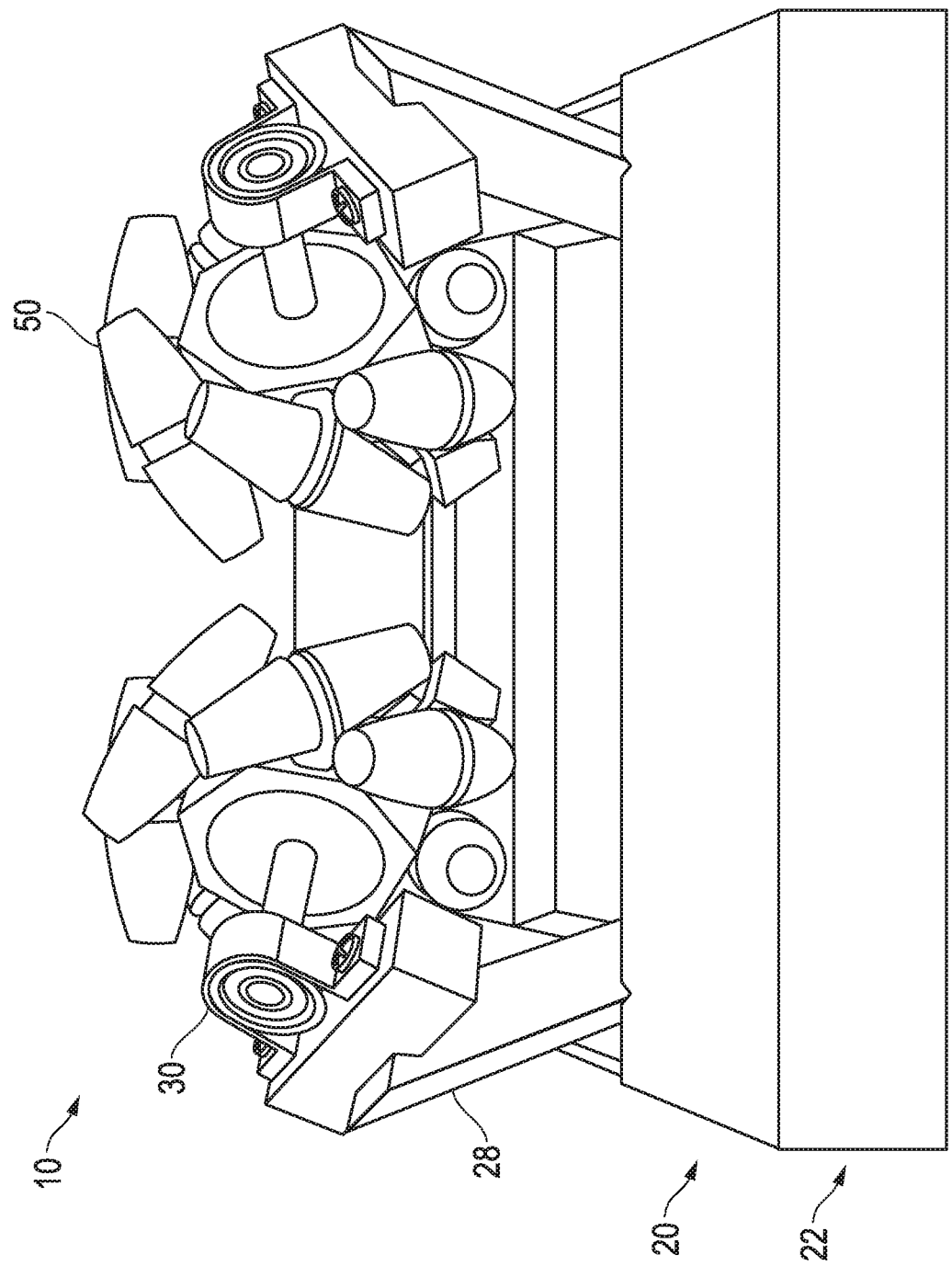
FIG. 20 depicts a rear elevation view of an exemplary embodiment of a new roller.
Figure 21:
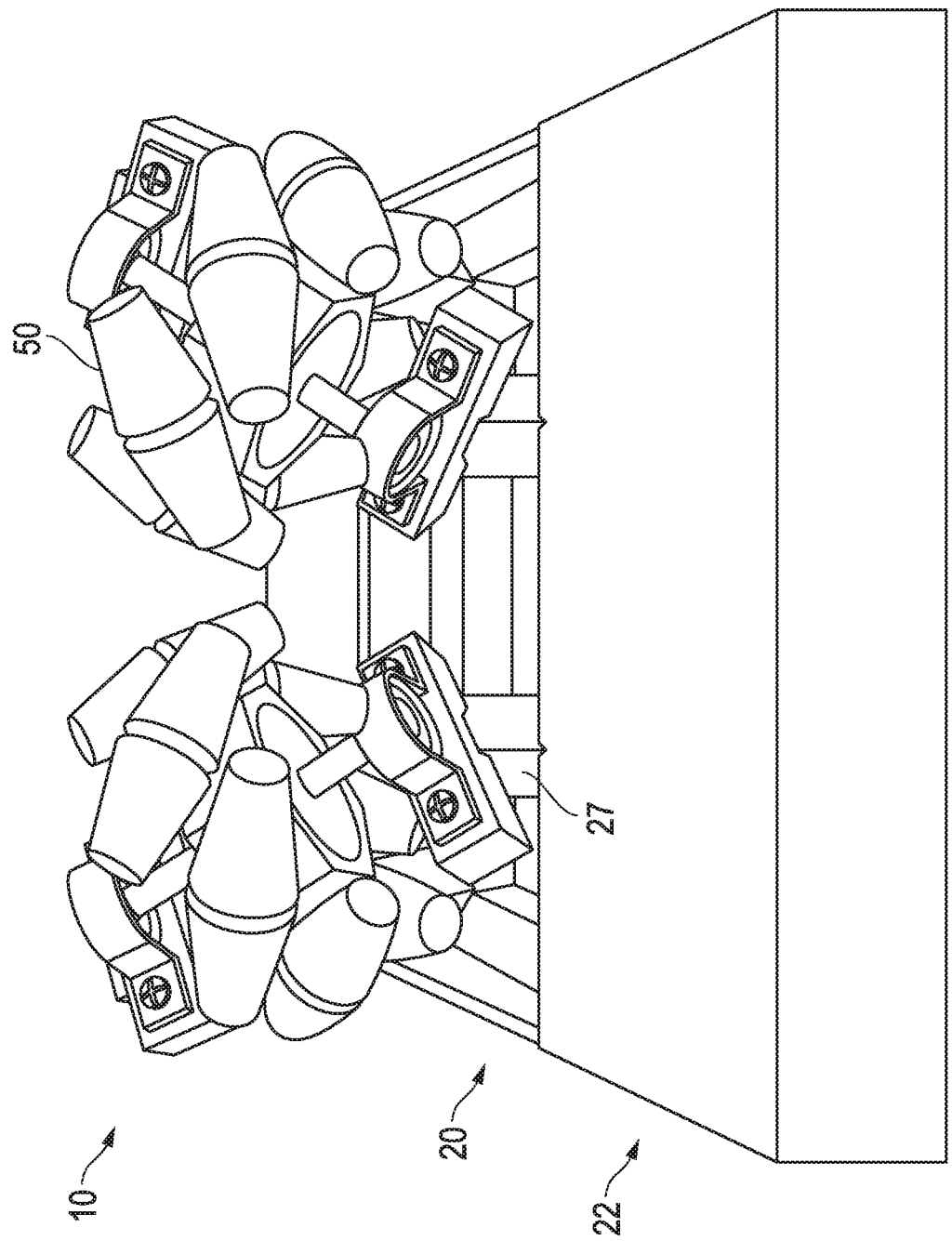
FIG. 21 depicts a front elevation view of an exemplary embodiment of a new roller.

There are normally two Mecanum wheels 50 per stand 20 mounted as discussed above. The distance D between such pair of Mecanum wheels 50 may be adjusted/adjustable as discussed above. Each roller 52 of a Mecanum wheel 50 may include a means to protect the product line 12 (or the coating of the product line 12), such as, for example, a plastic, a rubber, neoprene, or Teflon outer surface 54. Each Mecanum wheel 50 or its components may be an off-the-shelf part. FIGS. 20-21 depict alternate exemplary embodiments of the multidirectional roller(s) 10, having an alternative stand 20.

Referring to FIGS. 22-30, the depicted exemplary embodiments relate to the installation, rolling, and/or movement by means of a center or central pivoting holder or roller stand 10a of product line 12 and apparatus of same. Referring to FIGS. 31-39, the depicted exemplary embodiments relate to the installation, rolling, and/or movement by means of an eccentric or side pivoting holder or roller stand 10b of product line 12 and apparatus of same. These roller stands 10a and 10b may be implemented into a system for horizontal directional drilling (HDD) for support and movement of product line 12, similar as to the purpose of the roller(s) 10 as depicted in FIGS. 1-21.

The roller stands 10a and 10b for supporting, rolling and/or moving the product line 12 generally have a stand 20, bearing(s) 30, roller axle shafts 40a and 40b, and rotator(s)/spinner(s)/roller(s) 56.

Each stand 20 for roller stands 10a and 10b generally includes or is a frame or framework 22. Many embodiments of a stand 20 may be implemented, being the spacing between them to be determined by the characteristics of the product line or drill pipe 12 and the terrain where they will operate. In one exemplary embodiment of a stand 20 the frame 22 includes a first, main or primary platform, frame or structure 24, a secondary, rocking or pivoting platform frame or structure 66, a pivot or pivot member 70, one or more tracks 60, and upright supports 26. The primary platform 24 has two lower beams 24a and 24b to be mounted on the ground 14 and aligned horizontally and generally parallel to the axial direction of the product line 12 to be installed. The lower beams 24a and 24b are spaced laterally apart a sufficient distance to support the product line 12 to be supported, pushed, pulled and rotated. A center or central lower beam 24e may be installed approximately midway between the distance between lower beams 24a and 24b. The primary platform 24 also has two cross beams 24c and 24d to be mounted on the lower beams 24a, 24b and 24e and aligned horizontally and generally perpendicular to the lower beams 24a, 24b and 24e.

The secondary, rocking, or pivoting platform, frame or structure 66 is installed above the primary, first, or main platform, frame or structure 24 and is beneath the rotator(s) 56. The secondary platform 66 is connected to the primary platform 24 via pivot 70, and such pivot 70 enables secondary platform 66 to rotate or pivot relative to the primary platform 24. The primary platform 24 maintains a fixed position in relation to the ground 14. Rotator(s) 56 are in fixed position in relation to secondary platform 66 as mounted through upright supports 26 and a reinforcement beam 29. Accordingly, rotator(s) 56 will pivot when the position of the secondary platform 66 pivots and pivoting motion from rotator(s) 56 along pivot angle 76 (see FIG. 27 and FIG. 39) will also cause the secondary platform 66 to pivot in relation to the primary platform 24 as well. In certain alternative exemplary embodiments (not illustrated) the secondary platform 66 may be omitted and the pivot 70 may attach to the rotator(s) 56 via another connecting means as well.

In certain exemplary embodiments, at least two rotator(s) 56a and 56b are implemented, and each include a rotator axis or axle shaft 40a, 40b, respectively, the axis of which the rotator(s) 56a, 56b will rotate. The rotator axle shafts 40a and 40b are preferably positioned at an angle 42 (e.g. transverse) to each other or the horizontal from a front or rear view (see FIGS. 22 and 31), but the rotator axle shafts 40a are fixed end-to-end in line at 180° relative to each other from the top view (see e.g. FIGS. 23, 27, 32 and 39). The angle 42 can be increased or decreased to accommodate a desired diameter of the product line 12. Each end of the rotator axle shafts 40a and 40b is inserted into a bearing 30, which allows the rotator axle shafts 40a, 40b and also the rotator(s) 56a, 56b to rotate along the axes defined by the rotator axle shafts 40a, 40b. The rotator axle shaft 40 may turn/rotate within the bearings 30, may be fixed (i.e. no rotation) relative to and within bearing(s) 30 optionally mounted to the rotator(s) 56 (allowing the rotator(s) 56 to rotate relative to and on the rotator axle shaft 40), or both the rotator axle shaft 40 and the rotator 56 can rotate. Each bearing 30 may be fixedly installed on a bearing block or pillow block 32. The bearing block 32 may be directly mounted onto the upright supports 26 in one exemplary embodiment (see e.g. FIG. 22), or may be mounted onto the reinforcement beam 29 (see e.g. FIG. 25).

The reinforcement beams 29 are optional supports or trusses beneath each rotator 56a, 56b to which the upright supports 26 and/or the bearing blocks 32 may be connected. The upright supports 26 are generally two shorter posts 27a and 27b and two longer posts 28a and 28b. In an exemplary embodiment, the upright supports 26 are installed onto the secondary platform 66 and connected to the underside of the reinforcement beams 29 (see e.g. FIG. 25). In an alternate exemplary embodiment, the upright supports 26 may be installed onto the secondary platform 66 and onto the underside of the bearing blocks 32 (see e.g. FIG. 22). The two shorter posts 27 are generally installed closer towards the center of the stand 20, whereas the longer posts 28 are installed towards the outer sides of the stand 20, to accommodate or create the desired angle 42 between the rotator axle shafts 40a,40b. Additional brace/joint pieces and trusses, reinforcement pieces or beams 29 may also be implemented as desired to support, strengthen or elongate parts of the stand 20.

The pivot or pivot member 70 generally includes a pivot axle/axis or pin 72 which is inserted into a pivot sleeve 74 (e.g. a bearing or pivot member 70 allowing shaft or pivot sleeve 74 to rotate). The pivot axle 72 may turn/rotate within the pivot sleeve 74, may be fixed (i.e. no rotation) relative to and within pivot sleeve 74 (allowing rotator(s) 56 to pivot relative to and on the pivot axle/axis 72), or both the pivot axle 72 and pivot sleeve 74 may rotate. In certain exemplary embodiments, the pivot axle 72 may be connected to the rotator(s) 56 (directly or onto the secondary platform 66, or an upright support 26) and the pivot sleeve 74 connected to the primary platform 24; in other exemplary embodiments, the pivot sleeve 74 may be connected to the rotator(s) 56 (directly or onto the secondary platform 66, or an upright support 26) and the pivot axle/axis 72 may be connected to the primary platform 24.

Figure 22:
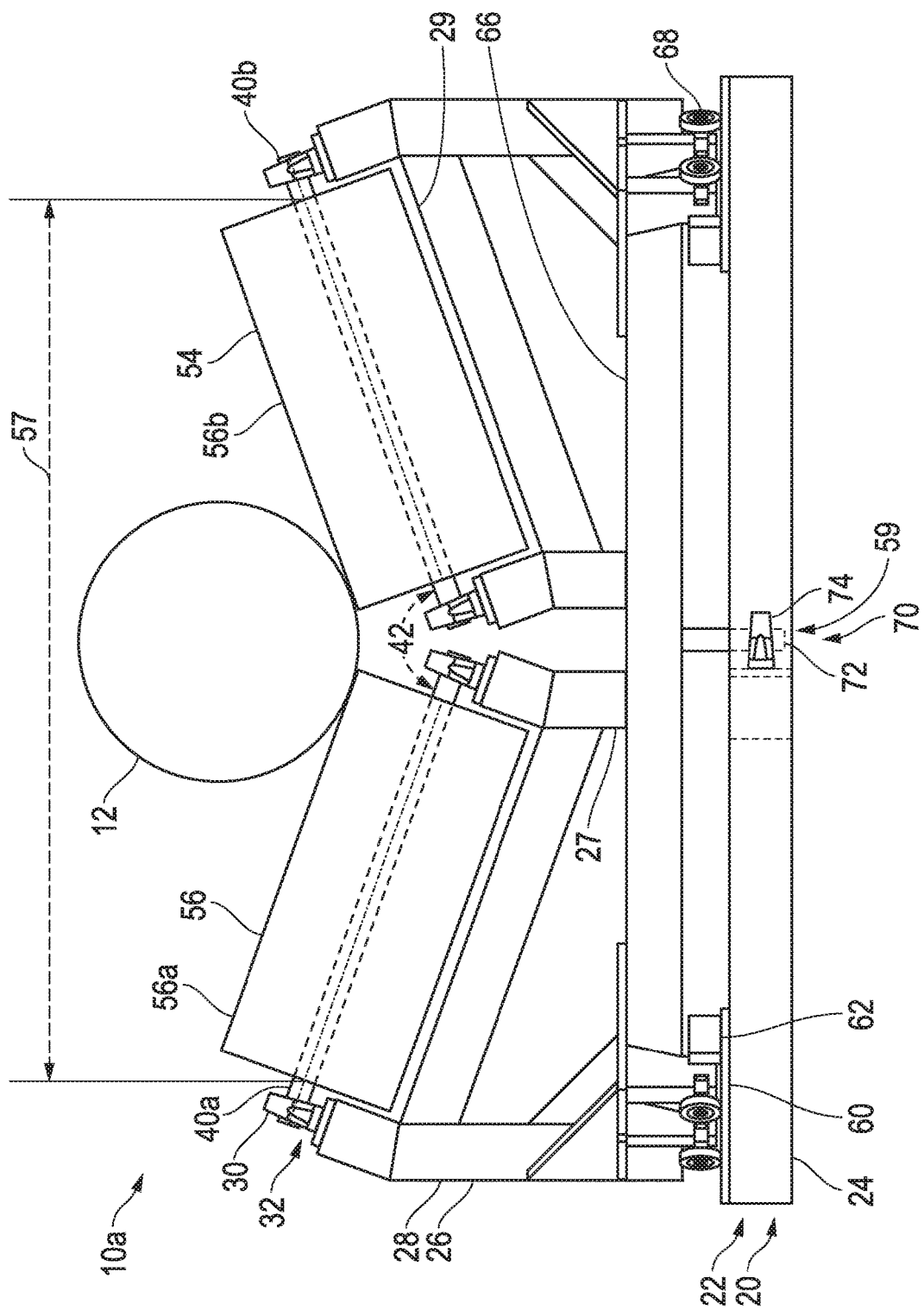
FIG. 22 depicts a front view of an exemplary embodiment of a new central pivot roller stand with product line.
Figure 23:
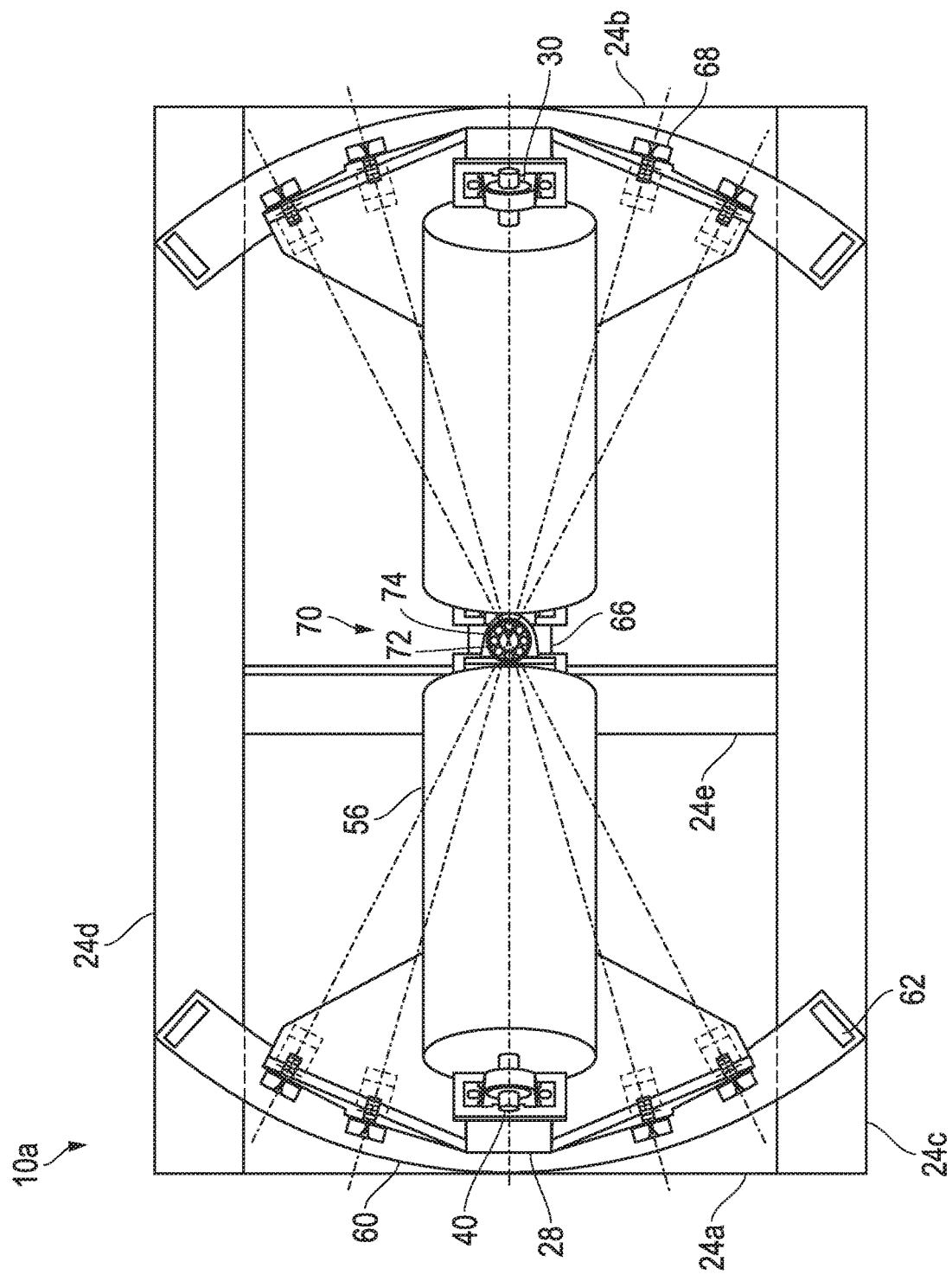
FIG. 23 depicts a top view of an exemplary embodiment of a new central pivot roller stand.
Figure 24:
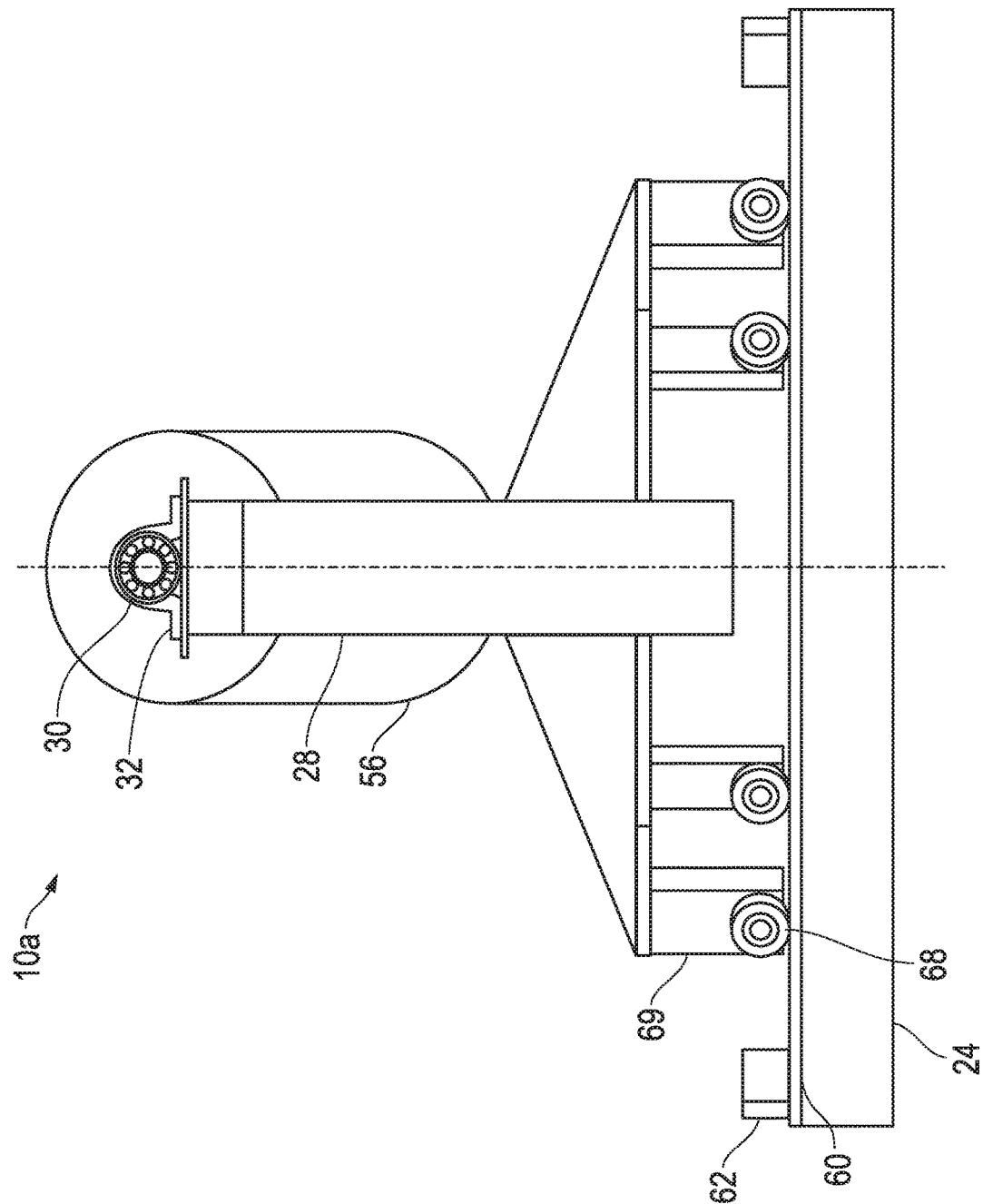
FIG. 24 depicts a lateral view of an exemplary embodiment of a new central pivot roller stand.
Figure 25:
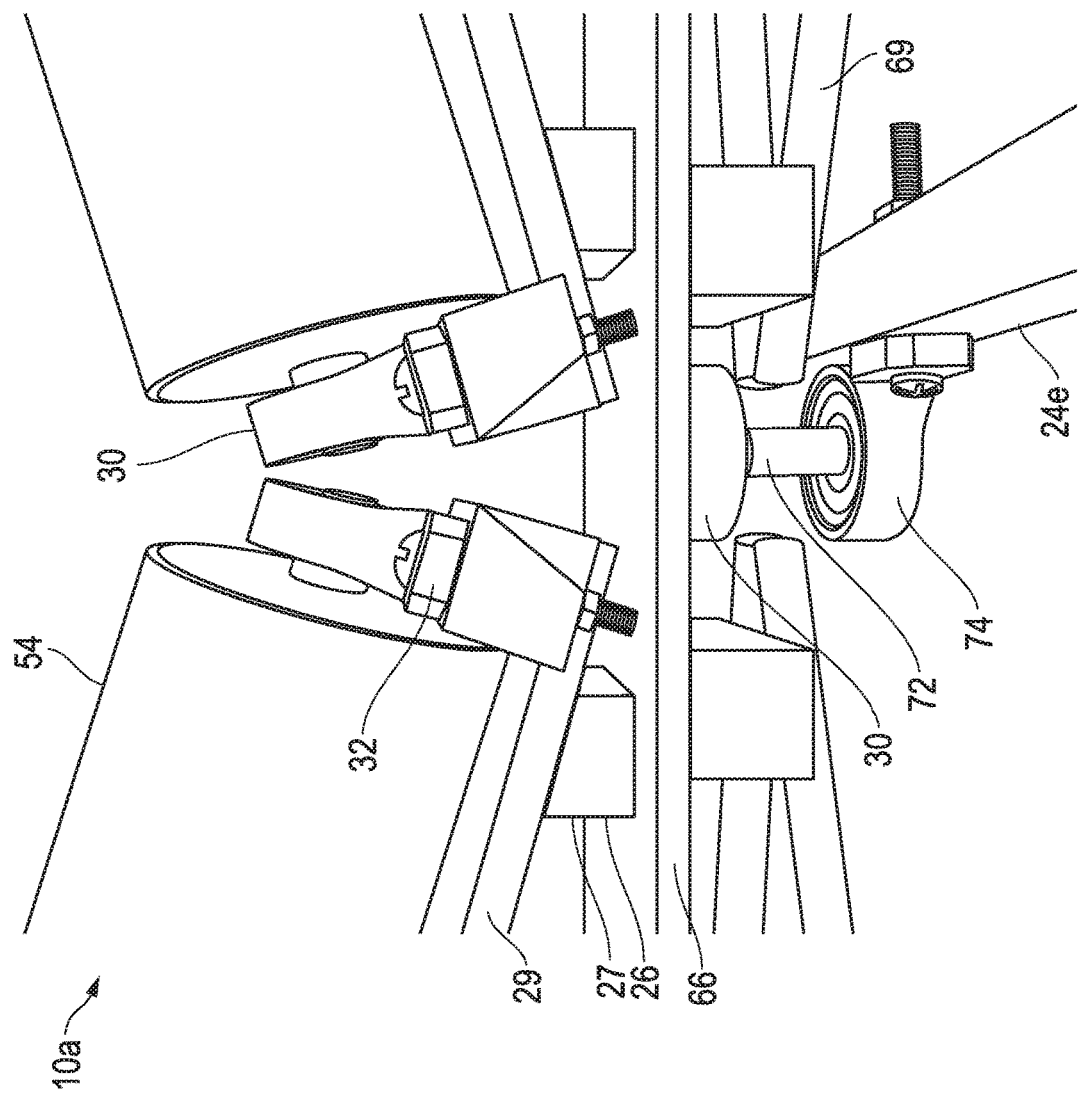
FIG. 25 depicts an enlarged front view of an exemplary embodiment of a new central pivot roller stand.
Figure 26:
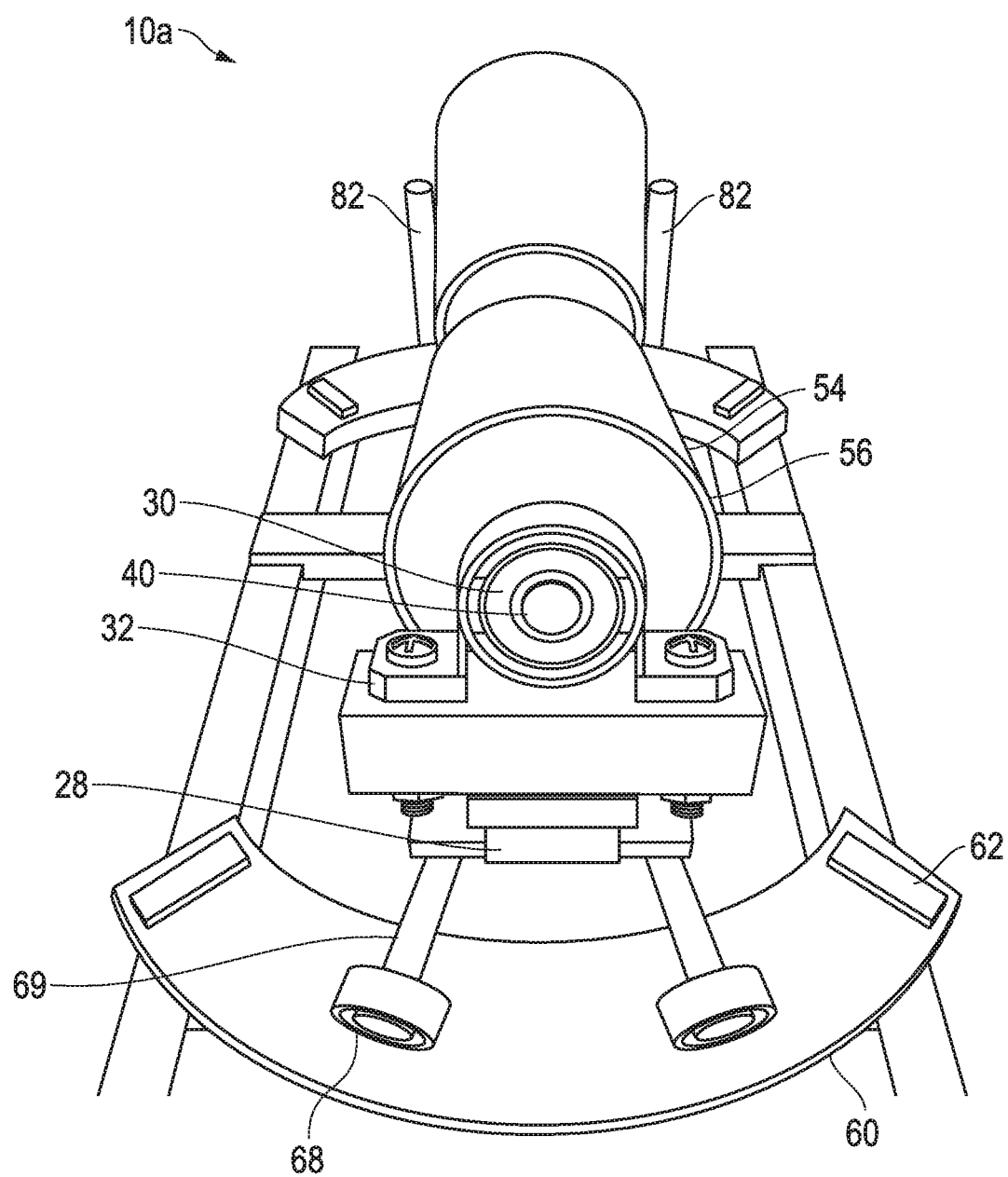
FIG. 26 depicts a lateral perspective view of an exemplary embodiment of a new central pivot roller stand.
Figure 27:
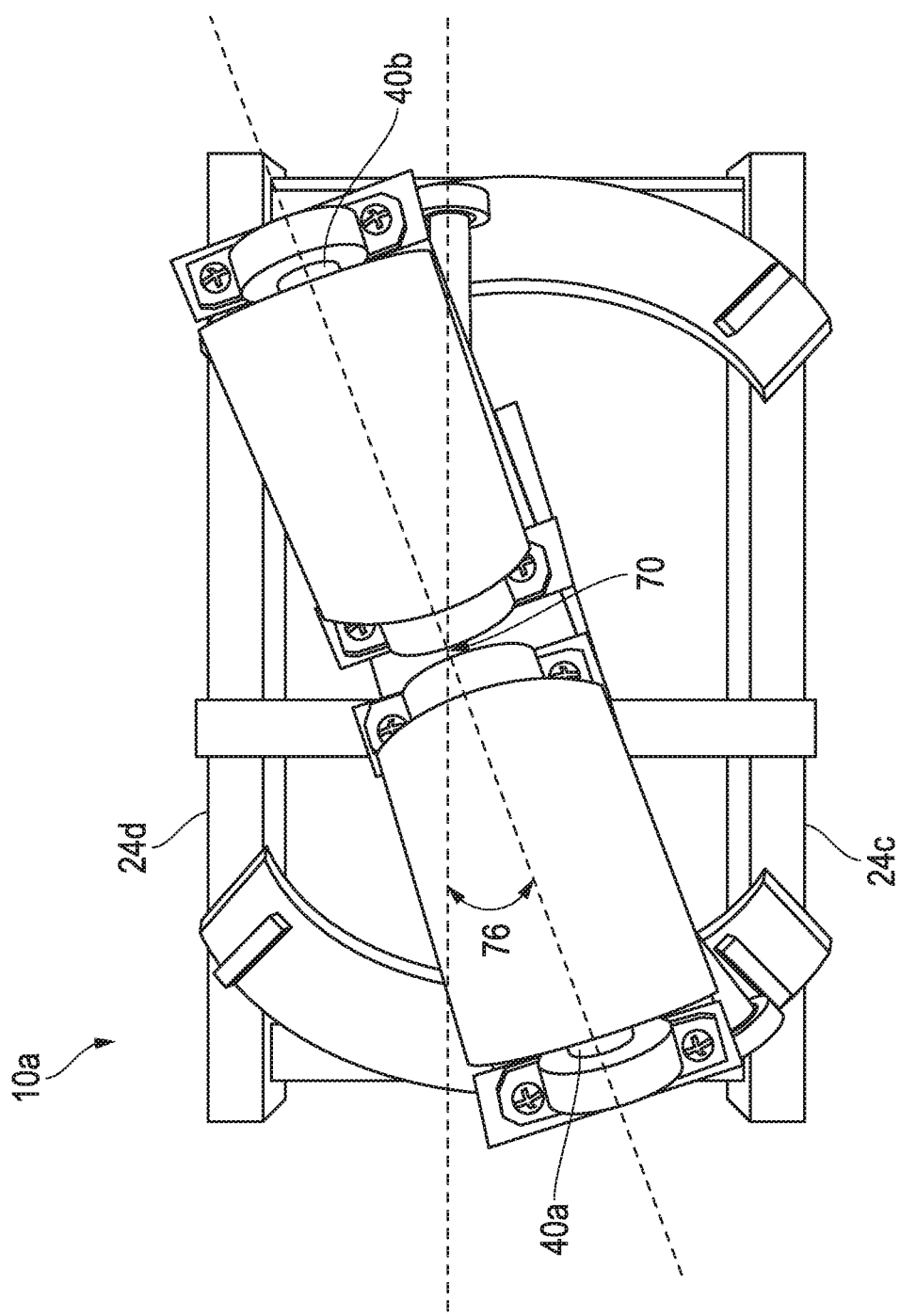
FIG. 27 depicts a top view of an exemplary embodiment of a new central pivot roller stand.
Figure 28:
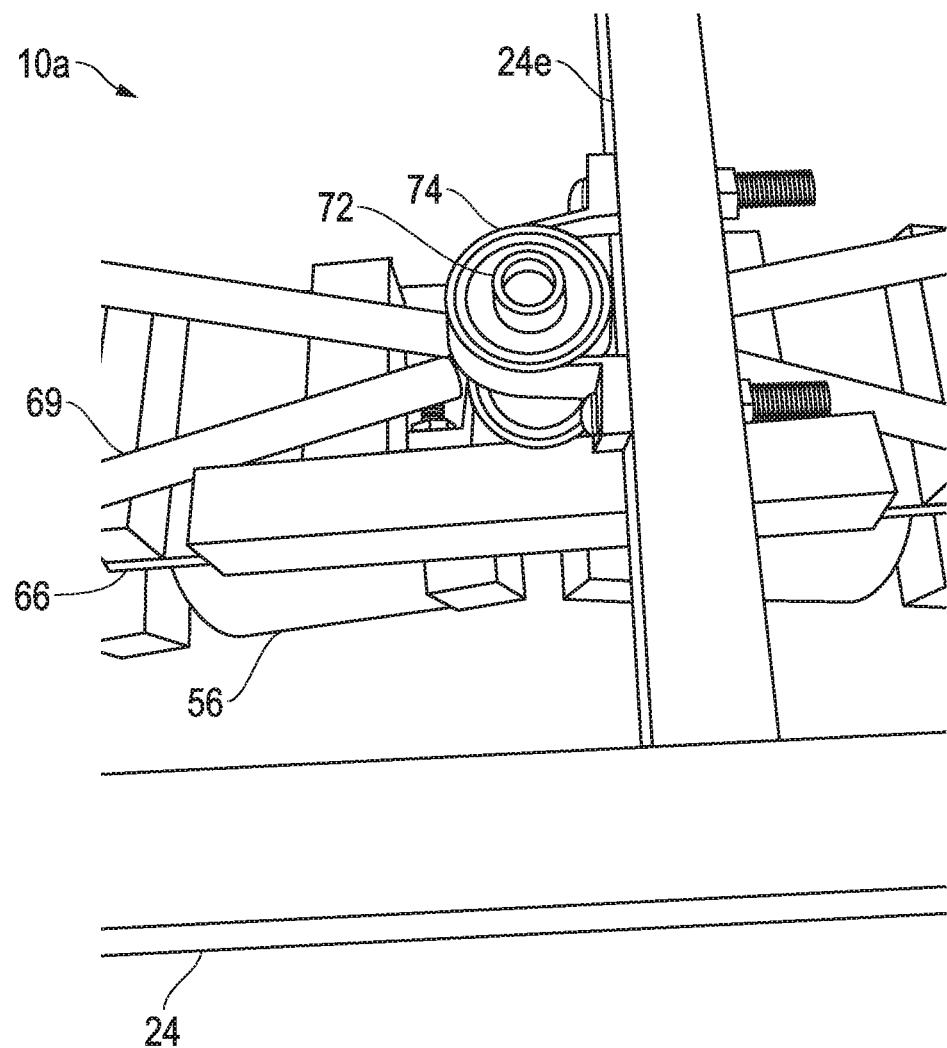
FIG. 28 depicts an enlarged underside view of an exemplary embodiment of a new central pivot roller stand.
Figure 29:
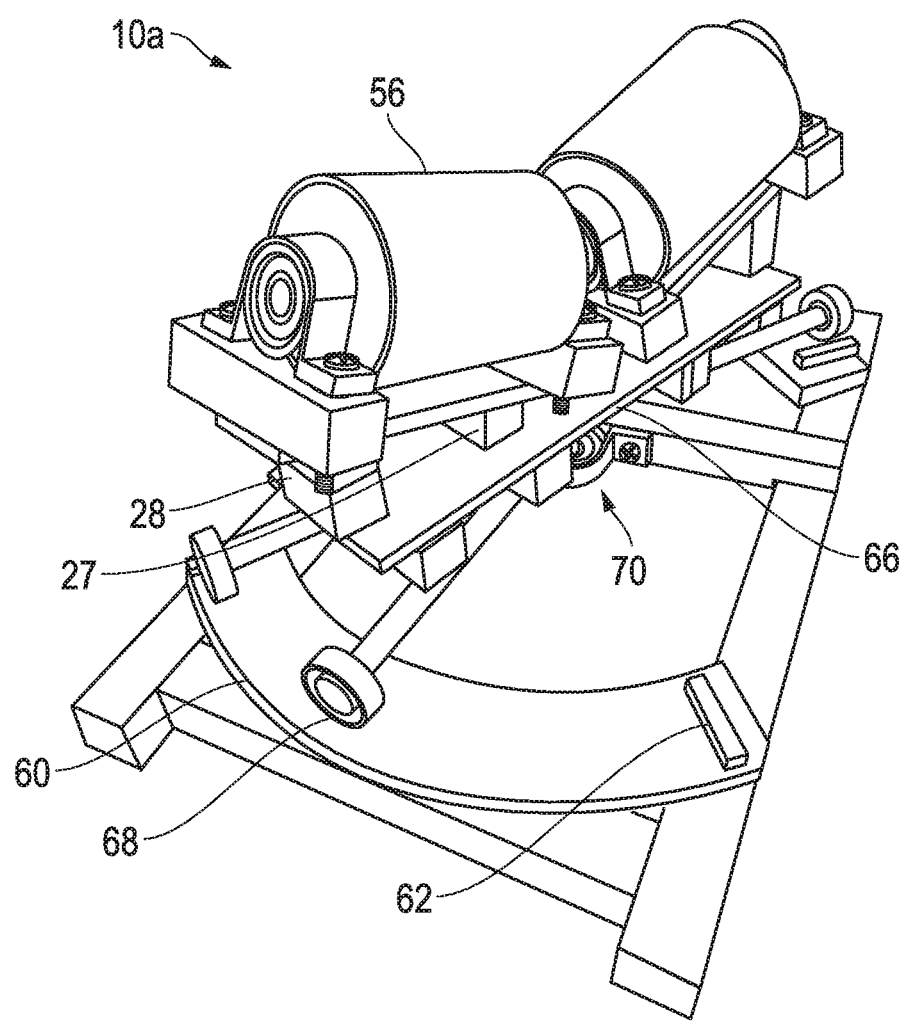
FIG. 29 depicts a perspective view of an exemplary embodiment of a new central pivot roller stand.

In the exemplary embodiment of the roller stands 10a depicted in FIGS. 22-30, the pivot 70 is connected at or towards the geometrical center 59 of the rotator or rotator wheels 56 (see FIG. 22). The geometrical center 59 may be approximately the center point or midway point of the length 57 of the rotator(s) 56. FIG. 25 depicts an enlarged front view of the pivot 70 in the central pivot roller stand 10a embodiment. As depicted in FIG. 25, the pivot sleeve 74 is affixed to the midpoint of the center lower beam 24e. The pivot axle 72 is connected to the underside of the secondary platform 66, between the two rotator(s) 56. A bearing 30 may optionally be installed on an end of the pivot axle 72 opposite to the pivot sleeve 74, to enable, encourage or support the smooth pivoting or rotational movement of the secondary platform 66 and rotator(s) 56 in relation to the primary platform 24.

Figure 31:
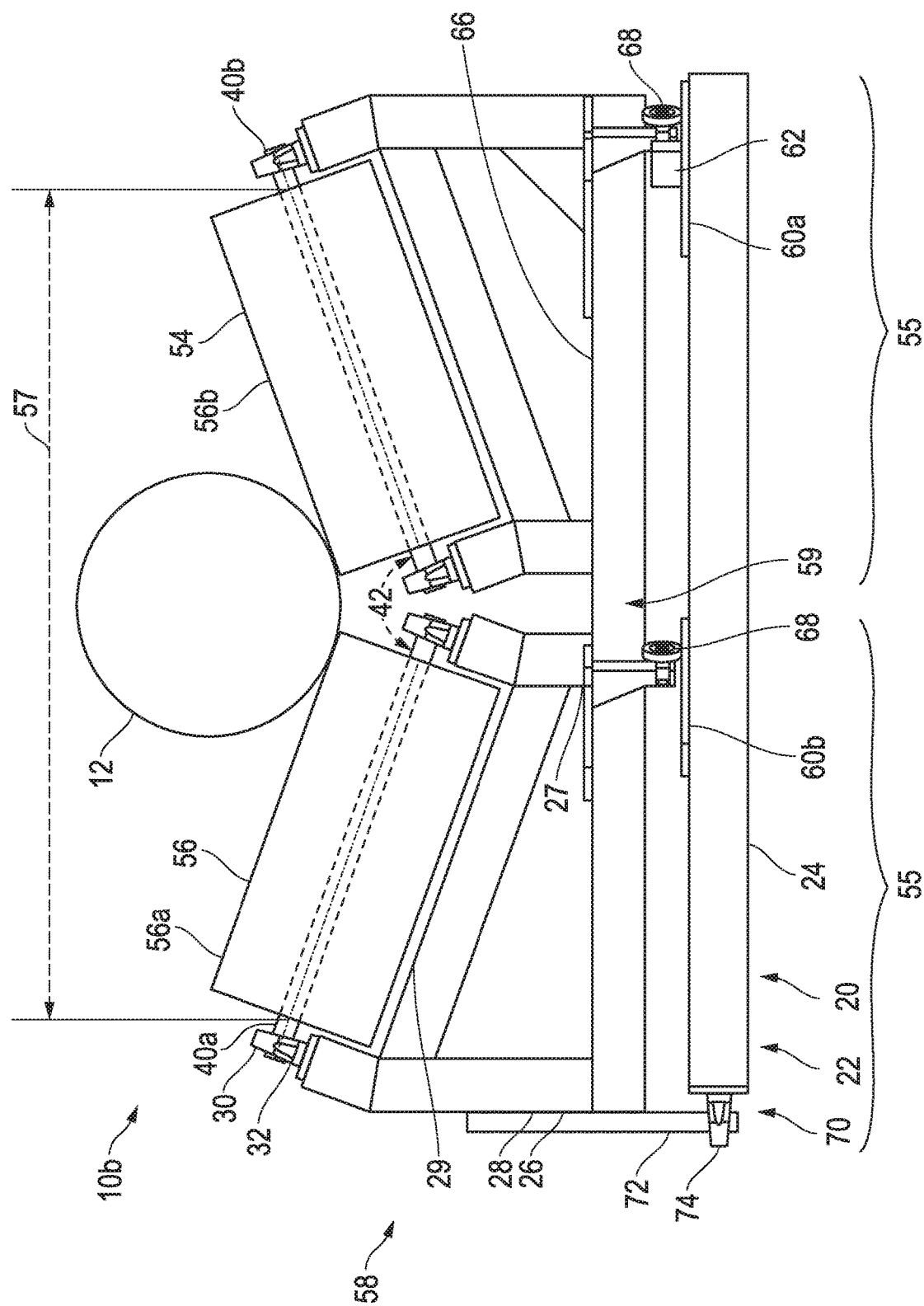
FIG. 31 depicts a front view of an exemplary embodiment of a new eccentric pivot roller stand with product line.
Figure 32:
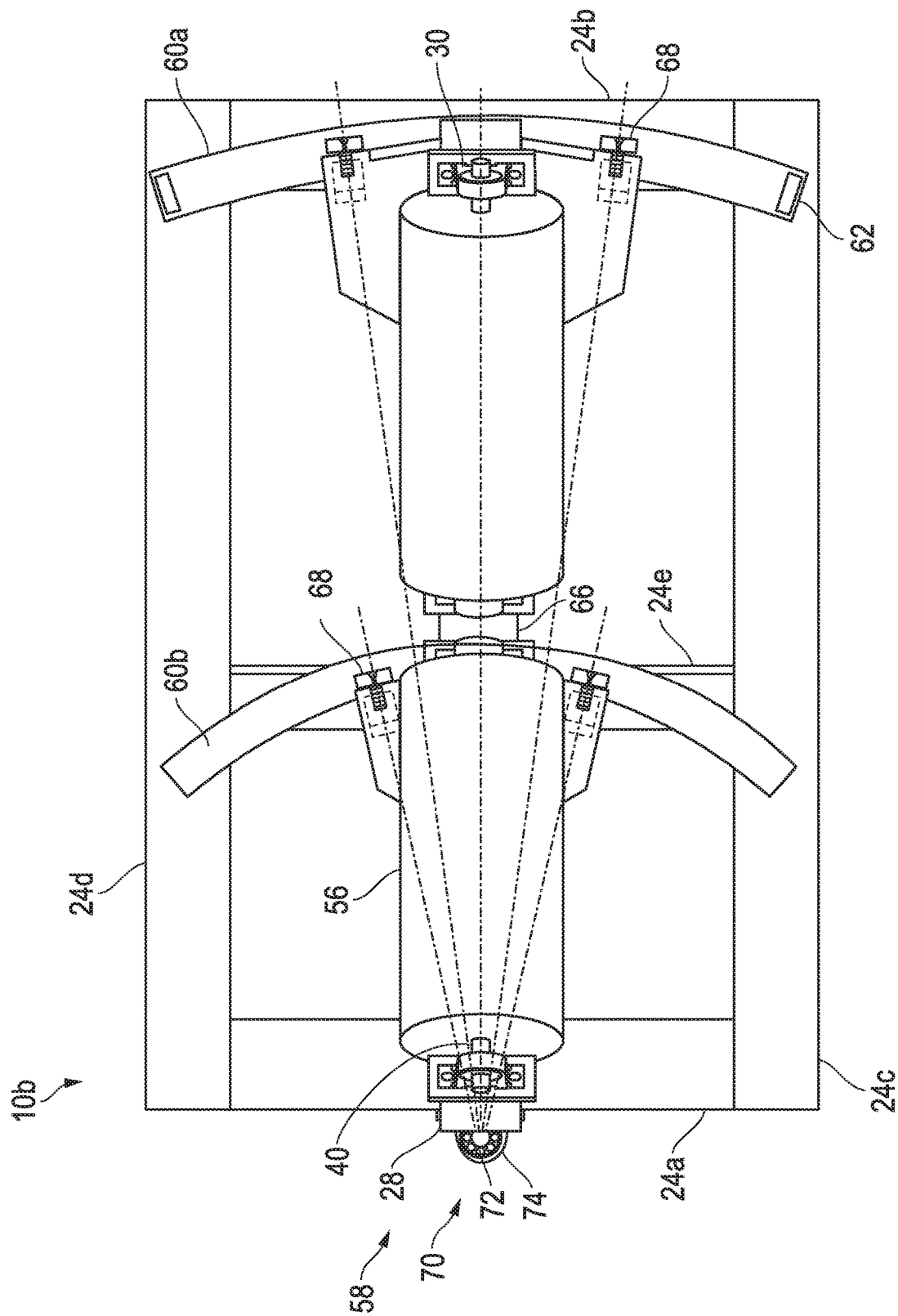
FIG. 32 depicts a top view of an exemplary embodiment of a new eccentric pivot roller stand.
Figure 33:
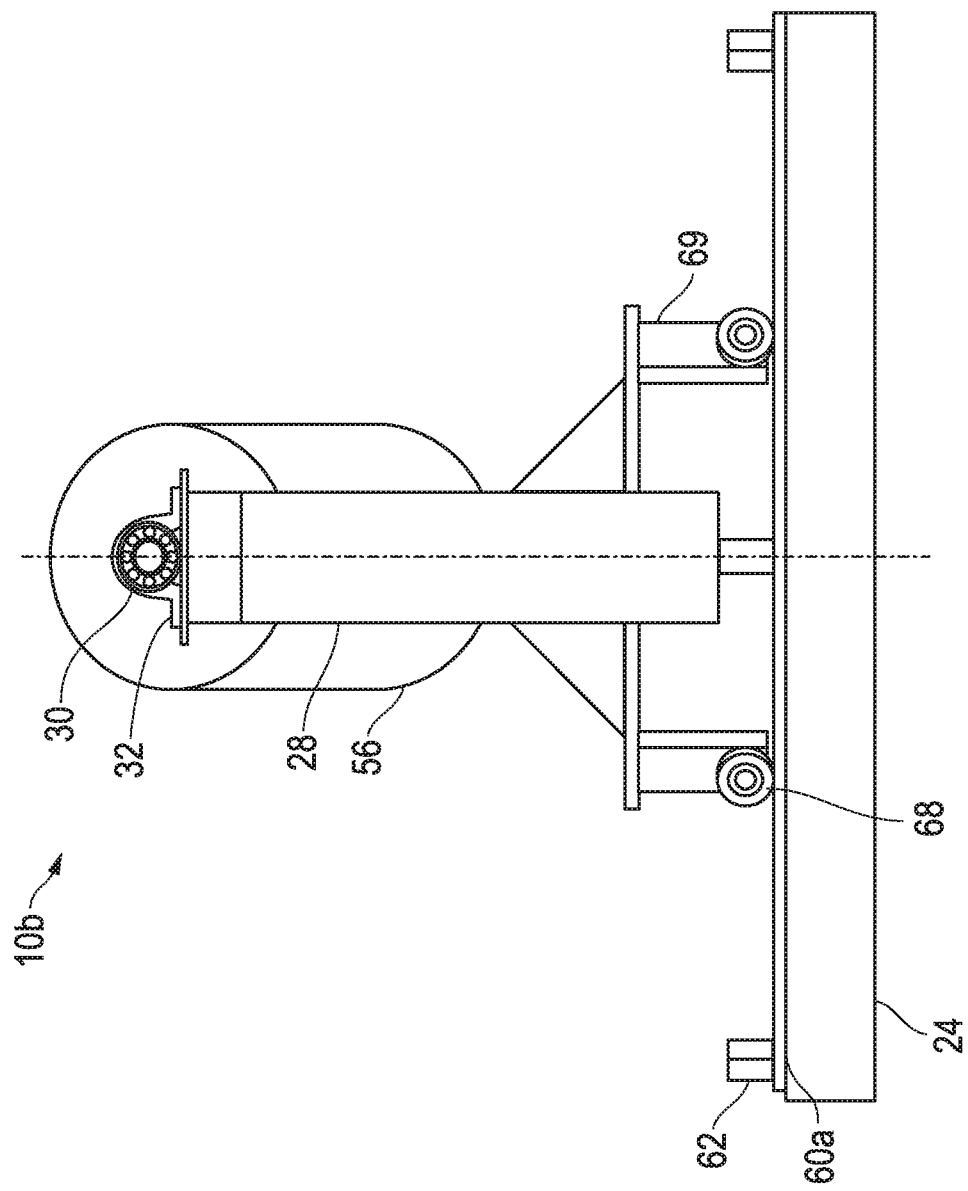
FIG. 33 depicts a lateral view of an exemplary embodiment of a new eccentric pivot roller stand.
Figure 34:
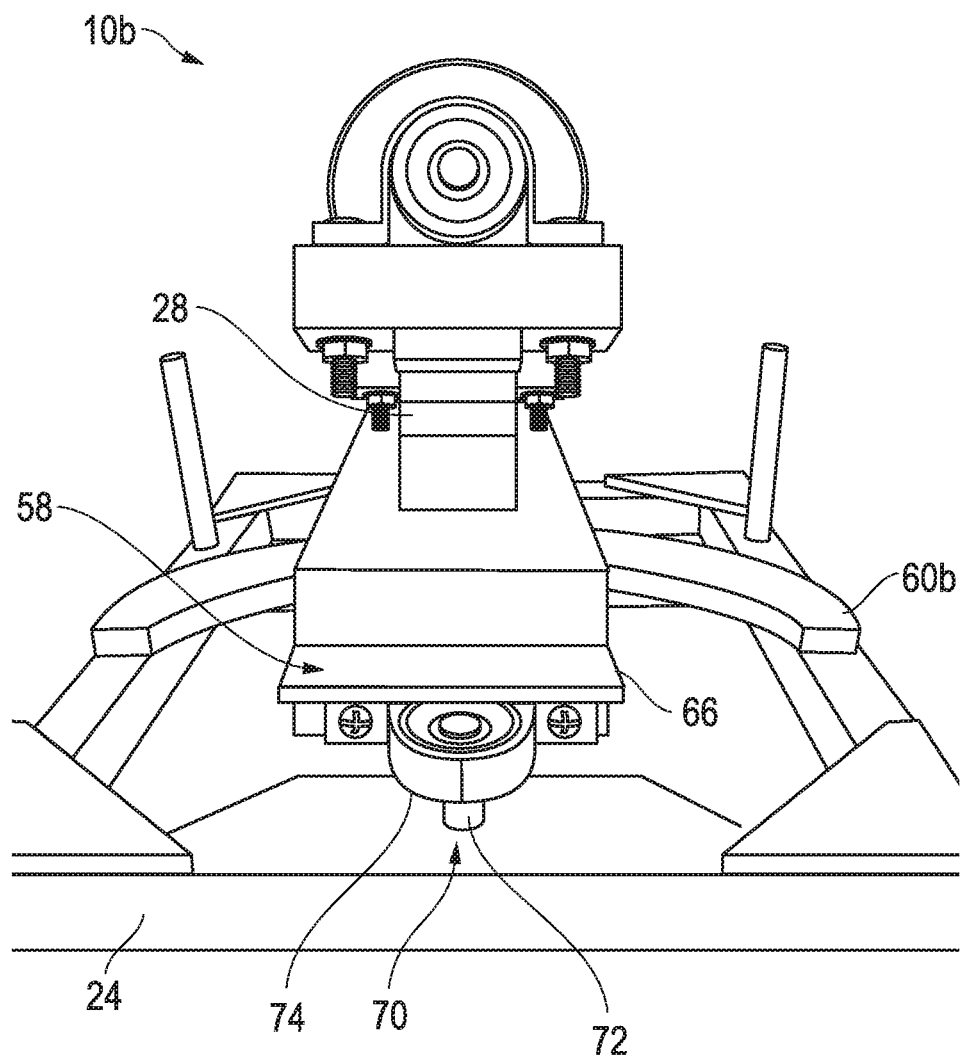
FIG. 34 depicts a lateral view of an exemplary embodiment of a new eccentric pivot roller stand.
Figure 35:
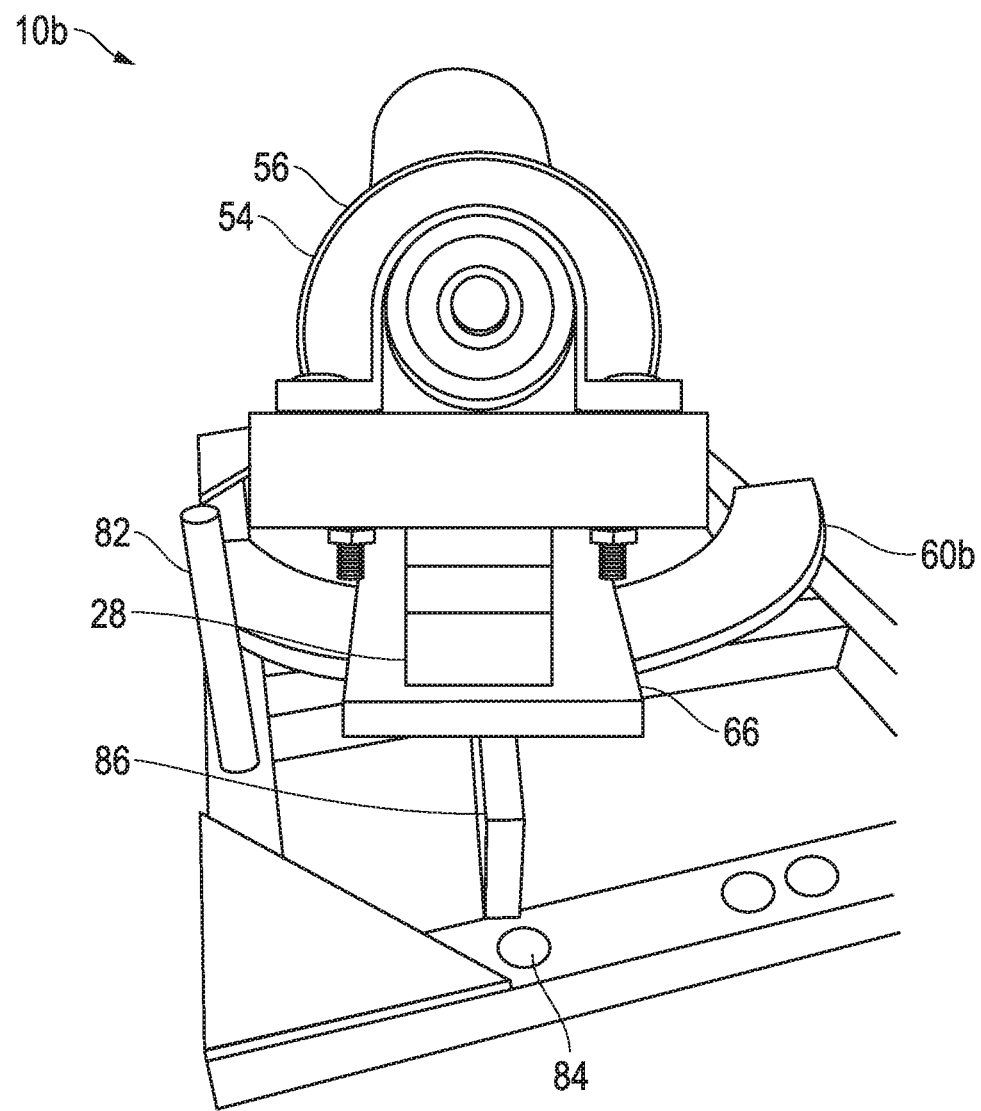
FIG. 35 depicts a lateral view of an exemplary embodiment of a new eccentric pivot roller stand.
Figure 36:
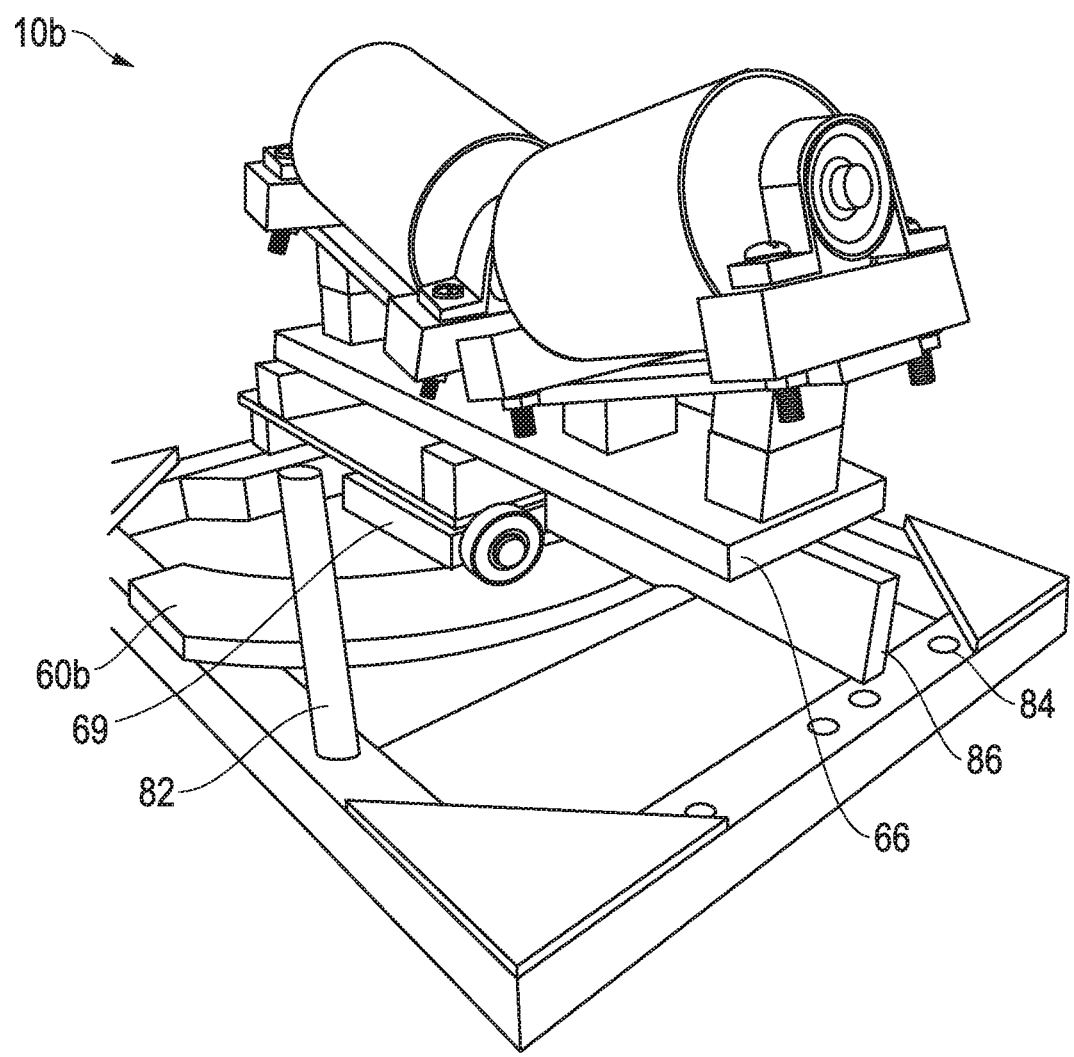
FIG. 36 depicts a perspective view of an exemplary embodiment of a new eccentric pivot roller stand.
Figure 37:
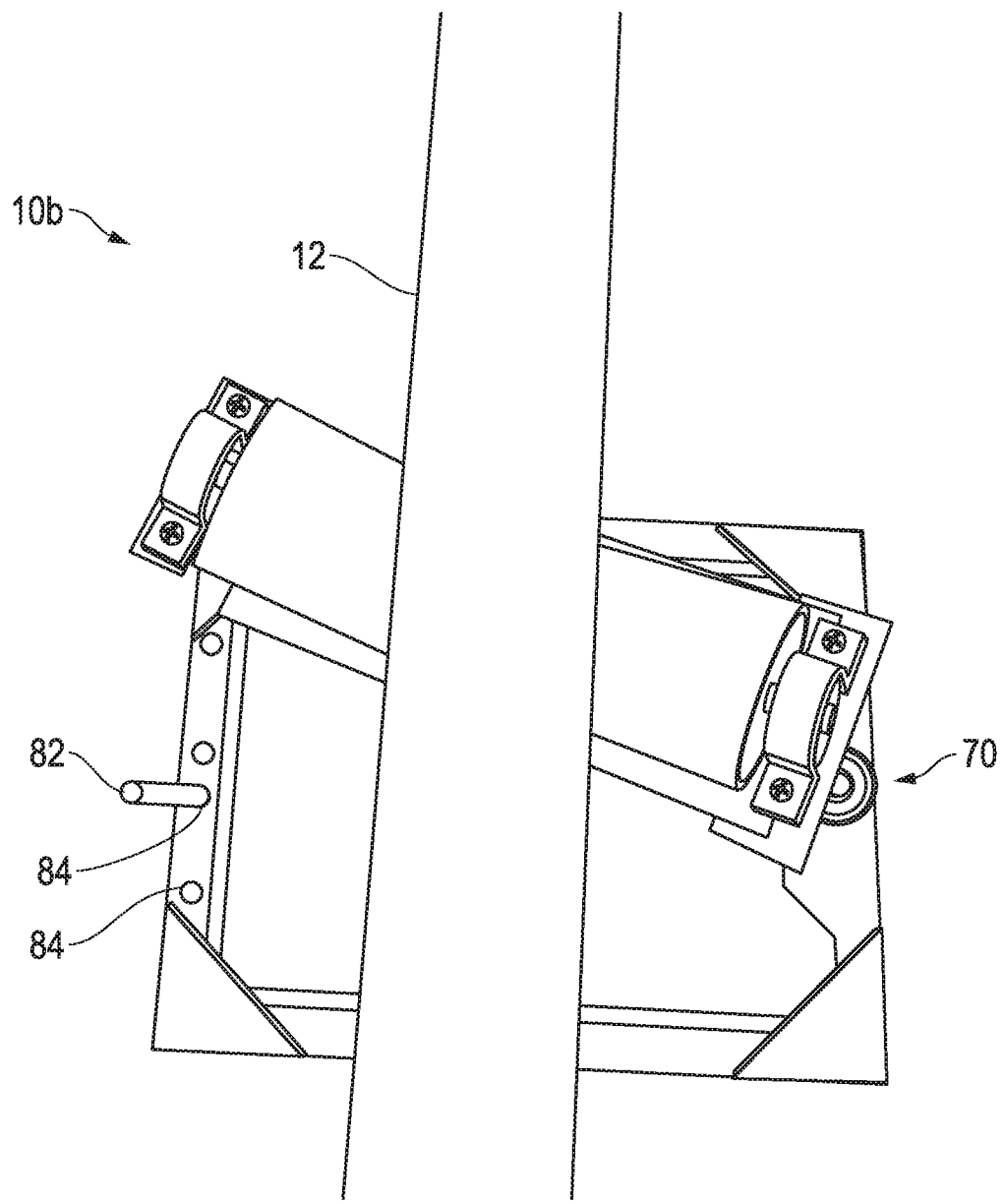
FIG. 37 depicts a top view of an exemplary embodiment of a new eccentric pivot roller stand with product line.
Figure 38:
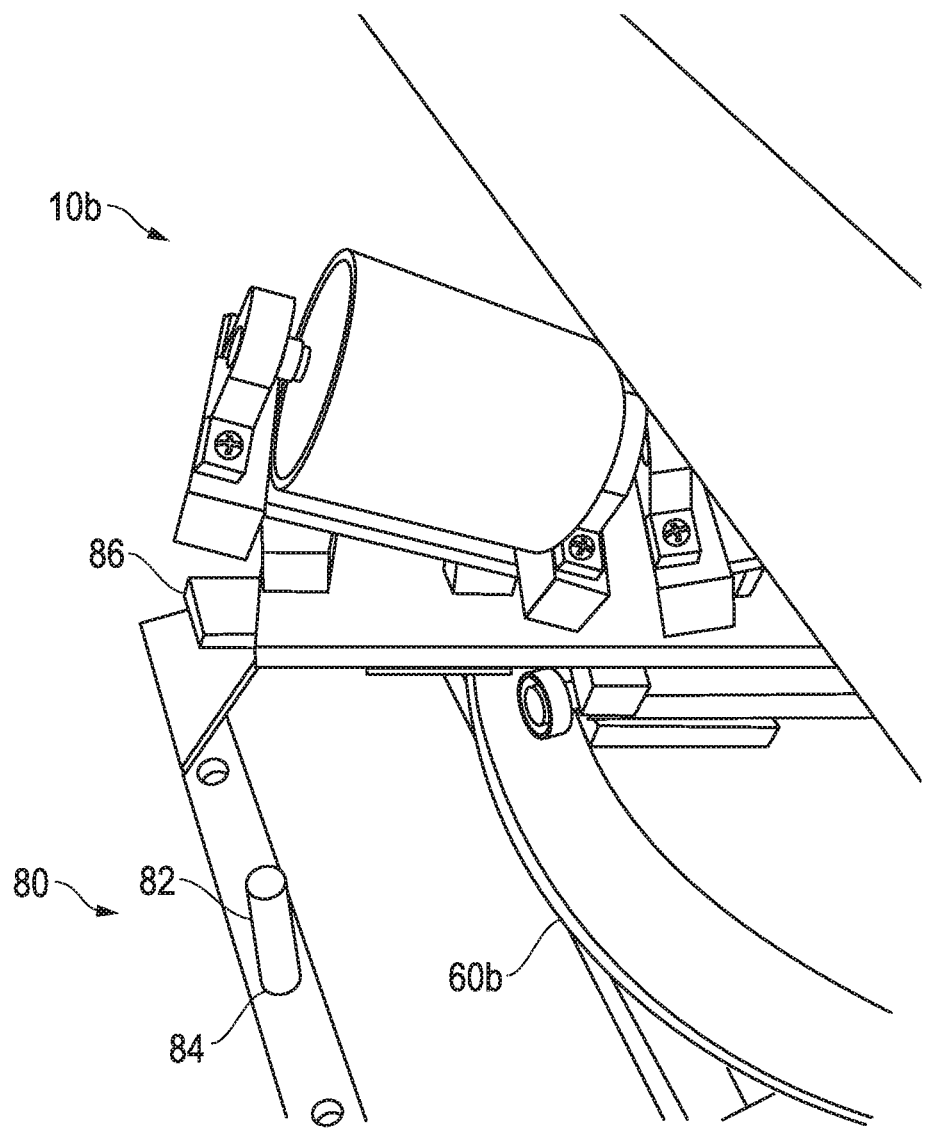
FIG. 38 depicts an enlarged perspective rear view of an exemplary embodiment of a new eccentric pivot roller stand with product line.
Figure 39:
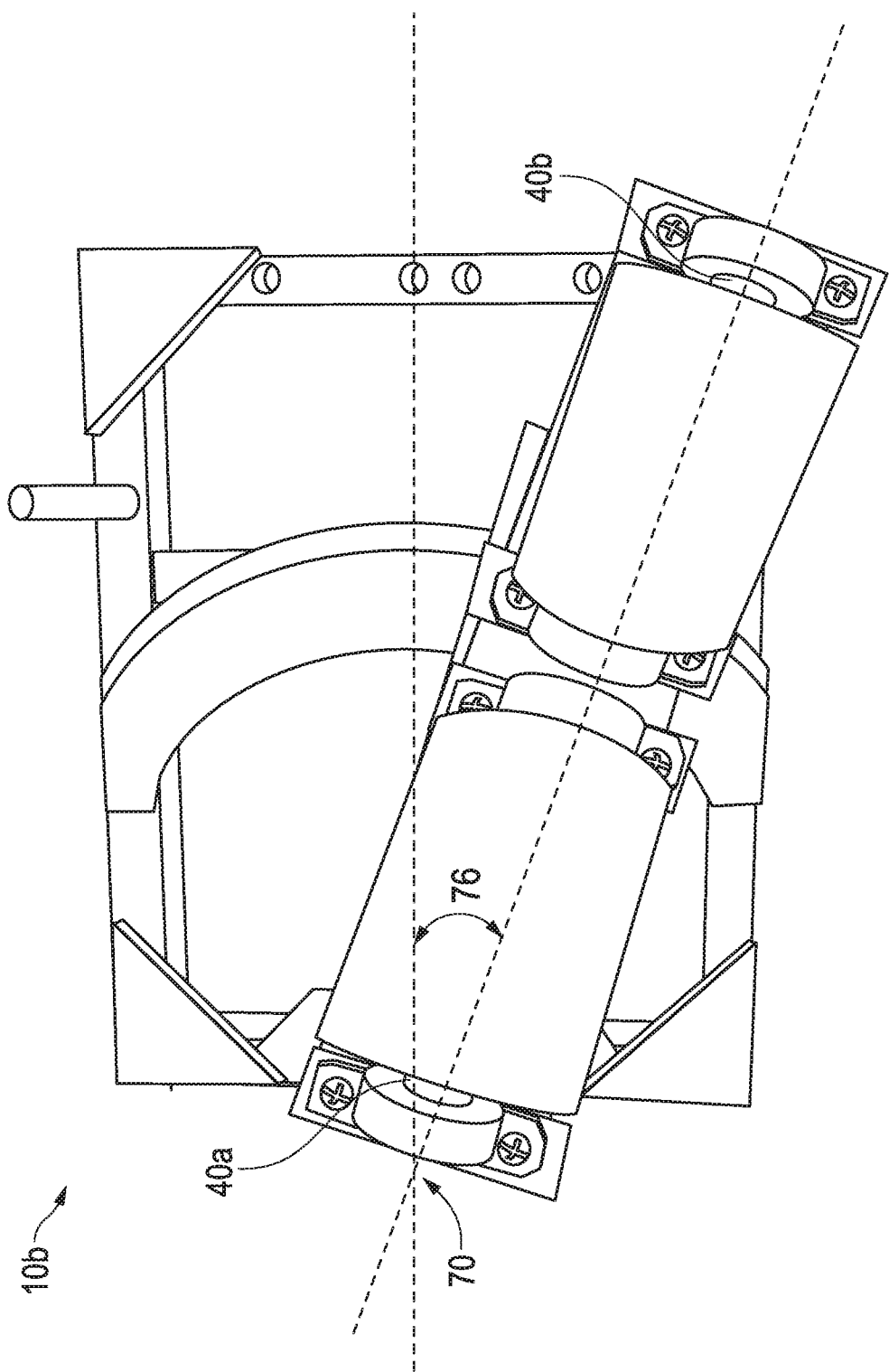
FIG. 39 depicts a top view of an exemplary embodiment of a new eccentric pivot roller stand.

In the exemplary embodiment of the roller stands 10b, as depicted in FIGS. 31-39, the pivot 70 is connected at a non-central location, point or area 55 (other than geometrical center 59) of the rotator or rotator wheels 56, such as an end 58 of the stand 20 (see FIG. 31). The geometrical center 59 may be defined as approximately the center point or midway point of the length 57 of the rotator(s) 56. The pivot 70 in the exemplary embodiments of the eccentric roller stands 10b does not necessarily need to be connected at the end 58 of the stand 20 as depicted—the pivot 70 in the exemplary embodiments or the eccentric roller stand 10b may be located anywhere other than the geometrical center 59 of the rotator(s) 56, as illustrated by the non-central area, point or location 55. As depicted in FIG. 34, one exemplary embodiment of roller stand 10b affixes the pivot sleeve 74 to the secondary platform 66, and the pivot axle 72 is affixed to the primary platform 24. The pivot sleeve 74 may be a type of bearing 30 which allows the secondary platform 66 and the rotator(s) 56 to rotate or pivot in relation to the primary platform 24.

In the exemplary embodiments of roller stand 10a, the pivot angle 76 is the angular deviation pivoted or rotated by the longitudinal axis of the rotator axles 40 in order to square or center the longitudinal axis of the rotator axles 40 to the product line 12 which was previously not square or centered.

In the exemplary embodiments of roller stand 10b, the pivot angle 76 is the angular deviation of the longitudinal axis of the rotator axles 40 away from rotator axles' 40 square, centered or perpendicular position to the product line 12, said angular deviation as set by the operator of the roller stands 10b in order to effect a desired rotational speed, desired rotational direction (clockwise or counter clockwise), and desired longitudinal speed of the product line 12. For example, with reference to FIG. 31 depicting a front view of the roller stand 10b, the pivot 70 is located substantially to a left side of the platform 22 or rotator(s) 56. This would affect/effect or induce rotation of the product line 12 in one direction (e.g. clockwise) as from the front view, regardless of whether the product line 12 is pushed or pulled (which may prevent unthreading of the product line or pipe 12 regardless of the direction the pipe 12 moves axially). However, the same embodiment of the roller stand 10b can be flipped so that the pivot member 70 located towards the right side or opposite side of the platform 22 or rotator(s) 56 and this would affect/effect rotation of the product line 12 in the opposite direction (e.g. counter clockwise) from the front view, regardless of whether the product line 12 is pushed or pulled.

Figure 40:
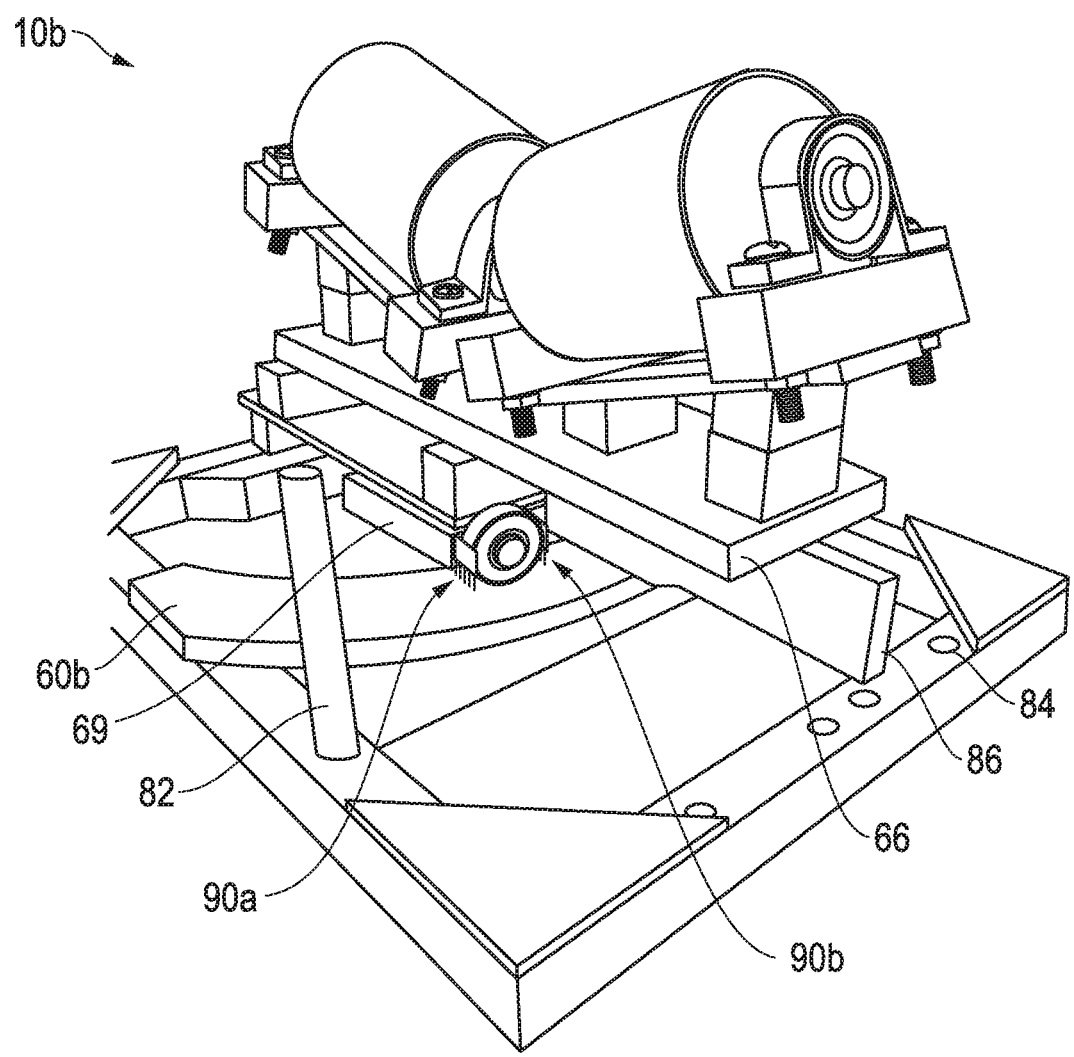
FIG. 40 depicts a perspective view of an exemplary embodiment of a new eccentric pivot roller stand having brushes.
Figure 41:
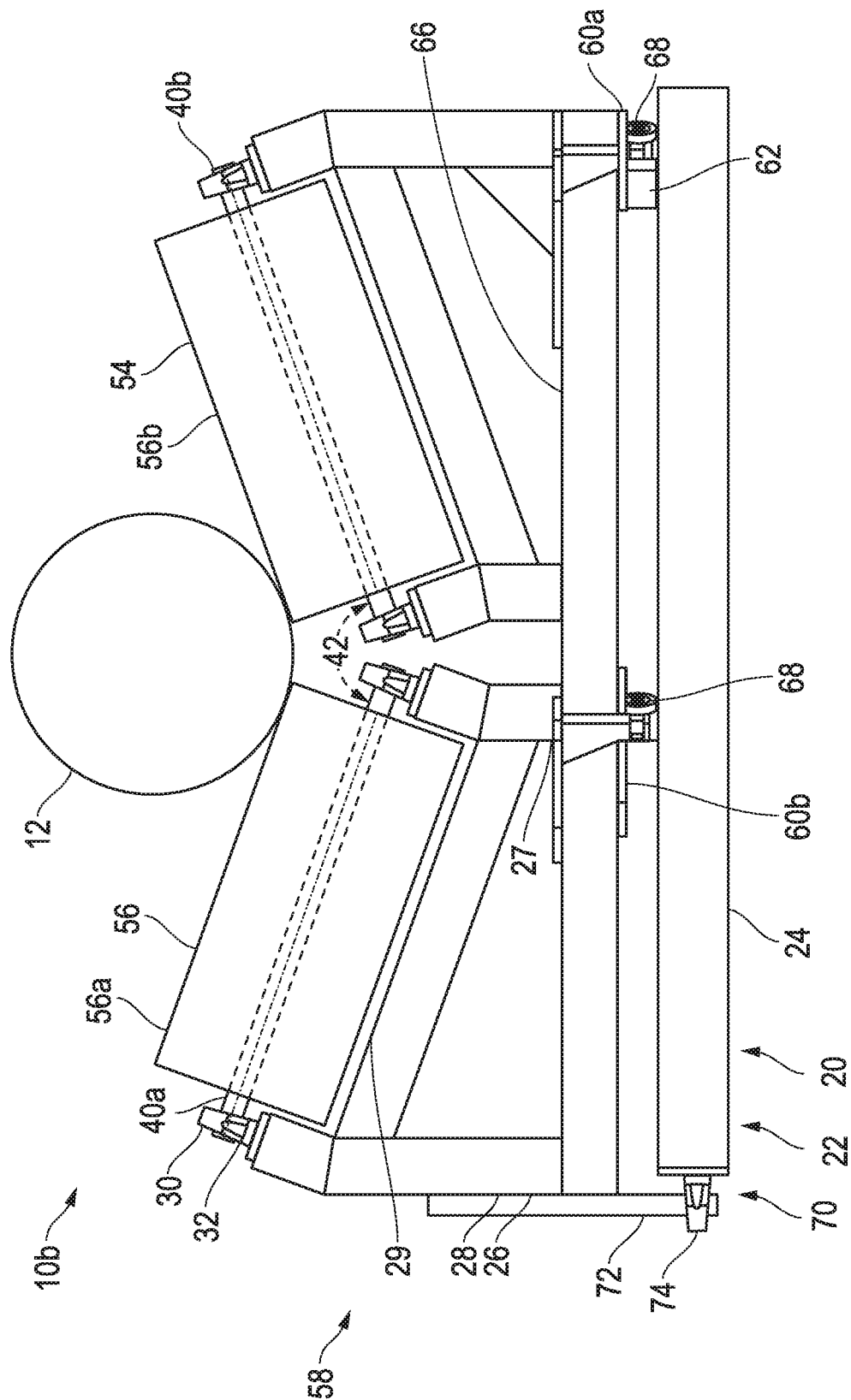
FIG. 41 depicts a front view of an exemplary embodiment of a new eccentric pivot roller stand with product line having tracks above the wheels.

In the exemplary embodiments of roller stands 10a and 10b, wheels 68 may be attached to the underside of the secondary platform 66, by any means known for attaching wheels 69, such as, and not limited to—rods, axles, nuts, bolts, bearings, and so on as known to one of ordinary skill in the art. Any number of wheels 68 that is desired may be used, and the wheels 68 may be entirely absent from the underside of one rotator 56, or both rotator(s) 56 (see e.g. the exemplary embodiment depicted in FIG. 36, wherein only one of the two rotator(s) 56 includes a set of wheels 68 underneath). When wheels 68 are implemented onto roller stands 10a and 10b, a corresponding track 60 is mounted on top of the primary platform 24 to provide for smooth pathway for movement of the wheels 68 across the surface of the track 60. The tracks 60 may be defined or circumscribed by as an arcuate path or partial circular circumference about the pivot 70. The tracks 60 may also include a track stop or block 62 sufficiently raised above the surface of the track 60 to prevent movement of the wheels 68 beyond a certain point or distance on the tracks 60. If there is more than one track 60, one or more of the tracks 60 may include the track stops 62. In certain exemplary embodiments of roller stand 10b as depicted in FIGS. 31-33, there may be two tracks 60: an outer track 60a and an inner track 60b. While the FIGS. 31-33 depict the outer track 60a with the track stop 62, it is to be appreciated that the inner track 60b may include the track stop 62 instead. Additionally, while the exemplary embodiments depicted of roller stands 10a show both tracks 60 with track stops 62, it is to be appreciated that only one track 60 may include track stops 62, or neither tracks 60 may include such track stops 62. Alternative exemplary embodiments of the wheels 68 may include sweeper brushes 90a, 90b (see FIG. 40) on either side of, or around the wheels 68. The purpose of the sweeper brushes 90a, 90b is to clean and sweep the track 60, and to ensure that the track 60 is free of debris such as gravel which could interfere with rotation of the wheels 68. The sweeper brushes 90a, 90b may be installed in front and behind any wheel 68 to be able to sweep the track 60 right before the wheel 68 enters into contact with the track 60 area. An alternative exemplary embodiment may mount the track 60 as part of the secondary platform or structure or rocking frame or pivoting frame 66, wherein the wheels 68 are installed or inserted into or under the track 60 and wherein the wheels 68 are fixed to the primary platform 24. In such alternative exemplary embodiment, the point of contact of the wheels 68 and the secondary structure 66 will be in the top of the circumference of the wheel 68, thus there is minimalized chance (due to gravity) that debris could be accumulated impending the normal rotation of the wheels 68.

Figure 30:
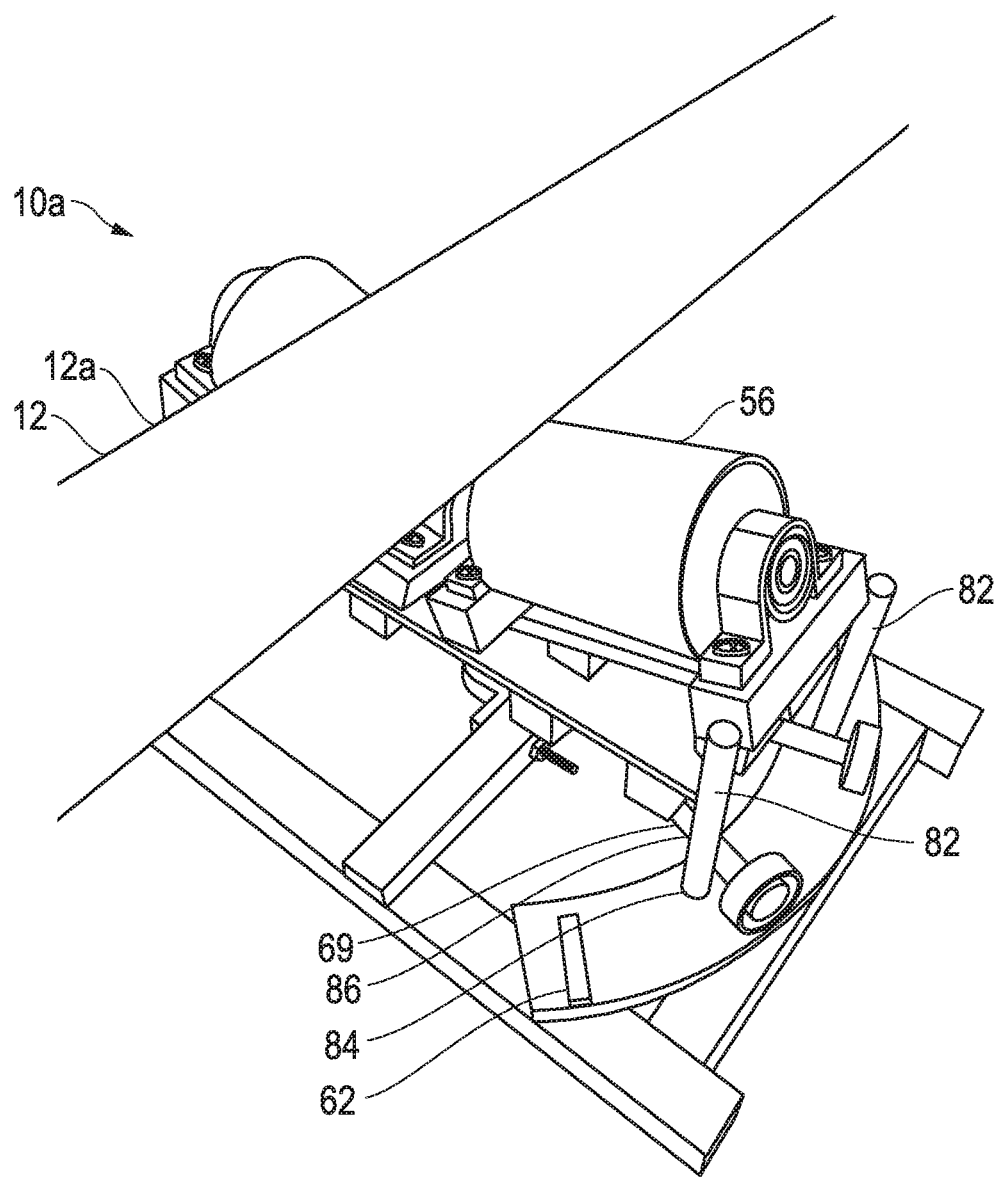
FIG. 30 depicts a perspective view of an exemplary embodiment of a new central pivot roller stand with a product line.

In addition to track stops 62 to prohibit motion of the wheels 68, the roller stands 10a may include a locking means 80 (as known to one of ordinary skill in the art) for preventing or prohibiting the movement of the wheels 68, and also preventing or prohibiting the pivoting movement of the rotator(s) 56 and secondary platform 66. While locking means 80 are optional for roller stands 10a, some form of locking means 80 must be present for roller stands 10b to set a desired pivot angle 76. One such exemplary locking means 80 is depicted in FIGS. 26, 30 and 36-39, but other types of locking means 80 as known to one of ordinary skill in the art are envisioned. The locking means 80 in the depicted figures include one or more holes 84 drilled into the platform 24, one or more pins 82 for insertion into the holes 84, and an extension 86 that is fixed in relation to the rotator(s) 56. This extension 86 may be attached to the secondary platform 66 as seen in FIGS. 36-39, or the extension 86 may be another element of the roller stand 10a,10b, capable of a size and length of engaging the pin 82. For example, as depicted in FIG. 30, the extension 86 may be the means of attaching wheels 69 and engages the pins 82 accordingly when rotating. The insertion of the pin 82 into a hole 84 sets a limited range of motion or rotation for the rotator(s) 56 and secondary platform 66 pivoting in relation to the primary platform 24 as extension 86 engages, contacts or bumps against the pin 82.

While there are normally two rotators or rotator wheels 56 mounted per roller stand 10a and 10b as discussed above, alternate exemplary embodiments with less and more than two rotator(s) 56 are included in the present disclosure. The distance between such pair of rotator(s) 56 may be adjusted/adjustable as discussed above. Each rotator 56 may include a means to protect the product line 12 (or the coating of the product line 12), such as, for example, a plastic, a rubber, neoprene, or Teflon outer surface. Each rotator 56 or its components may be an off-the-shelf part also including a coating 54 itself. The rotator(s)/spinner(s)/roller(s) 56 are preferably cylindrical, but may be other shapes that may spin or rotate and move a pipe and/or allow a pipe to move in two directions, such as, by way of example only, conical, bullet shaped, or if only one is used cylindrical with a belted, reduced or saddle-type central region.

The exemplary embodiments of the roller stand 10a are intended to correct for misalignment of the product line or pipe 12 wherein the product line 12 is not perfectly square or perpendicular to the normal position of roller stand 10a. The initial, or normal position of the roller stand 10a can be seen in FIG. 23. When the product line 12 is properly aligned, the normal position of the roller stand 10a is sufficient and the roller stand 10a will not pivot the rotator(s) 56 in relation to the primary platform 24. However, this is not always the case in practice, and the product line 12 is often misaligned (or not perpendicular to the normal position of the roller stand 10a). In conventional or standard roller stands, this misalignment will often cause the product line 12 to flip over the roller stands or otherwise damage the roller stands and/or the surroundings.

However, with the improved roller stand 10a, in such instances where the product line 12 is misaligned, the rotator(s) 56 will pivot or rotate through the pivot means 70 under the weight of the product line 12 (i.e. via gravity) such that the longitudinal axis of the rotator axles 40 becomes squared with or perpendicular to the product line 12. The process in which the rotator(s) 56 align its rotator axles 40 to be perpendicular to the product line 12 as a result of the weight of the product line 12 may be referred to as "self-centering" or "self-squaring". The pivot angle 76 is reflective of the angular deviation necessary to square the longitudinal axes of the rotator axles 40 to the product line 12. The wheels 68 may travel over the track 60 to enable or assist with the pivoting motion of the rotator(s) 56. The distance between the pivot 70 and the geometrical center 59 of the rotator(s) 56 originates a momentum when the product line 12 starts moving back or forward, inducing the rotation of the secondary platform or structure 66, which induces the rotation of the product line 12 located over the rotator(s) 56. The product line 12, now resting and perpendicular with the rotator axles 40 can now proceed to move longitudinally (e.g. in a for-aft or back-and-forth motion along or coincident with its own longitudinal axis) without danger of unintended rotation or flipping the roller stand 10a.

The exemplary embodiments of the roller stands 10b are intended to effect a desired or intended rotational direction (clockwise or counter clockwise), a desired rotational speed (or rotations per minute, "RPM"), and a desired longitudinal speed of the product line 12. The desired rotational direction, rotational speed, and longitudinal speed of the product line 12 can be effected through control or setting of the eccentric pivot angle 76 through the locking means 80. A greater pivot angle 76 results in the greater rotational speed of the product line 12, and the lower longitudinal speed of the product line 12. A smaller pivot angle 76 results in lower rotational speed of the product line 12, and greater longitudinal speed of the product line 12. When the pivot angle 76 is set to 0° (or alternatively, when the roller stand 10b is locked via locking means 80 into the normal or initial position as seen in FIG. 32), there is no rotational direction or movement of the product line 12, and there is only longitudinal movement of the product line 12. The eccentric pivot angle 76 is set through locking means 80 which can prohibit the pivoting of the rotator(s) 56 (and the longitudinal axis of the rotator axles 40) from moving beyond the pivot angle 76. Wheels 68 may assist or enable movement of the rotator(s) 56, the rotator axles 40 and the secondary platform 66 to the desired position. The setting of the pivot angle 76 can control the rotational direction regardless of the longitudinal direction (e.g. if the pivot angle 76 sets a clockwise rotation of the product line 12, the product line 12 rotates clockwise regardless of pulling or pushing the product line 12). Rotational movement of the product line 12 may be desired to reduce the static coefficient of friction between the pipe or product line 12 and the rotators 56 to lowest as much as possible the necessary pull force to install the product line 12 into a previously drilled hole. The use of improved roller stands 10b may also remove the conventional need for use of a swivel (not illustrated) connection between the drill pipe to the product line 12.

Each stand 20 of rollers 10, 10a and 10b is normally mounted on the ground 14 for support and movement of product line 12 or drill pipe in, for example, a HDD system. By way of example, the spacing between each consecutive stand 20 on the ground 14 may be thirty feet (i.e. one stand 20 per every thirty feet). For completion of an HDD crossing or pullback the product line 12 or the drill pipe tail string may extend for approximately the entire distance of the underground crossing. The teachings and disclosure of U.S. Provisional Application Nos. 62/384,097 and 62/411,109 are hereby incorporated by reference.

The rotator(s) 56 together with the pivot member/pivoting 70 may enable moving of the pipe 12 axially and rotationally, whilst reducing resistance, finding a location of least resistance, and/or minimizing the force needed to push/pull and/or rotate for movement of the pipe 12.

While the embodiments are described with reference to various implementations and exploitations, it will be understood that these embodiments are illustrative and that the scope of the inventive subject matter is not limited to them. Many variations, modifications, additions and improvements are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

The invention claimed is:

1. An omnidirectional roller apparatus for supporting and moving a product line or drill pipe tail string in connection with an underground arcuate path in a ground beneath an obstacle, comprising:
   a stand mounted on the ground, wherein the stand has a frame;
   at least two bearings mounted on the frame;
   a rotational shaft mounted to and extending from each bearing; and
   an omnidirectional wheel mounted on each of the rotational shafts, wherein each of the omnidirectional wheel rotates about the respective rotational shaft; and further wherein each rotational shaft has a mounting angle of forty-five degrees from the longitudinal axis, forty-five degrees from the vertical axis, and forty-five degrees from the transversal axis.

2. The omnidirectional roller apparatus according to claim 1, wherein the frame comprises a platform and a plurality of upright supports, and wherein the upright supports comprise two shorter posts and two longer posts.

3. The omnidirectional roller apparatus according to claim 2, wherein the mounting angle of each rotational shaft is defined by the connection of a first end of each rotational shaft to one of the shorter post and the connection of a second end of each rotational shaft to one of the longer post.

4. The omnidirectional roller apparatus according to claim 1, wherein said omnidirectional wheel has a plurality of rollers and wherein each of the plurality of rollers includes a means for protecting the product line.

5. The omnidirectional roller apparatus according to claim 2, wherein the at least two bearings comprise at least four bearings, and wherein each bearing is mounted, one each on top of the shorter posts and longer posts; and further wherein a first end of each rotational shaft is connected to the bearing at the top of the shorter post and wherein a second end of each rotational shaft is connected to the bearing at the top of the longer post; and further wherein each omnidirectional wheel is mounted proximate the center along the length of each rotational shaft.

6. The omnidirectional roller apparatus according to claim 1, wherein each bearing is in a center of said omnidirectional wheel.

7. The omnidirectional roller apparatus according to claim 2, wherein a lateral width of the frame is adjustable.

8. A method for selectively installing a pipe from above a ground for use in an underground arcuate path beneath an obstacle, and for using another pipe at an exit site during reaming operations of HDD activities for use in the underground arcuate path beneath the obstacle comprising the steps of:
   supporting the pipe on sets of two omnidirectional wheels;
   rotating the pipe on the omnidirectional wheels;
   moving the pipe longitudinally across the omnidirectional wheels; and
   rotating the omnidirectional wheels about a rotational axis, wherein the rotational axis is mounted at an angle of forty-five degrees from the longitudinal axis, forty-five degrees from the vertical axis, and forty-five degrees from the transversal axis.

* * * * *